(12) United States Patent
Kwon et al.

(10) Patent No.: US 8,780,860 B2
(45) Date of Patent: Jul. 15, 2014

(54) APPARATUS AND METHOD FOR TRANSMITTING SOUNDING REFERENCE SIGNAL IN WIRELESS COMMUNICATION SYSTEM SUPPORTING MULTIPLE COMPONENT CARRIERS

(75) Inventors: Ki Bum Kwon, Ansan-si (KR); Myung Cheul Jung, Seoul (KR); Eun Kyoung Ko, Seoul (KR)

(73) Assignee: Pantech Co., Ltd., Seoul (KR)

( * ) Notice: Subject to any disclaimer, the term of this patent is extended or adjusted under 35 U.S.C. 154(b) by 284 days.

(21) Appl. No.: 13/098,056

(22) Filed: Apr. 29, 2011

(65) Prior Publication Data

US 2011/0268087 A1  Nov. 3, 2011

(30) Foreign Application Priority Data

May 1, 2010 (KR) .................. 10-2010-0041154
Aug. 12, 2010 (KR) .................. 10-2010-0077971

(51) Int. Cl.
*H04W 4/00* (2009.01)

(52) U.S. Cl.
USPC .................. 370/331; 370/328; 370/329

(58) Field of Classification Search
None
See application file for complete search history.

(56) References Cited

U.S. PATENT DOCUMENTS

2008/0280638 A1* 11/2008 Malladi et al. ................ 455/522
2009/0042616 A1*  2/2009 Teo et al. ................... 455/562.1
2010/0118723 A1*  5/2010 Pani et al. .................... 370/252
2010/0246561 A1*  9/2010 Shin et al. .................... 370/345

OTHER PUBLICATIONS

International Search Report dated Dec. 27, 2011 for International Application No. PCT/KR2011/003225.
R1-101819, "Consideration on Dynamic Aperiodic Sounding", 3GPP TSG-RAN WG1 Meeting #60bis, Apr. 12-16, 2010.
R1-101971, "Dynamic Aperiodic UL Sounding Design", 3GPP TSG-RAN WG1 Meeting #60bis, Apr. 12-16, 2010.
R1-101985, "Further Discussion on Aperiodic Sounding", 3GPP TSG-RAN WG1 Meeting #60bis, Apr. 12-16, 2010.
R1-102357, "Discussion on Dynamic Aperiodic Sounding", 3GPP TSG-RAN WG1 Meeting #60bis, Apr. 12-16, 2010.

* cited by examiner

*Primary Examiner* — David Oveissi
(74) *Attorney, Agent, or Firm* — H.C. Park & Associates, PLC

(57) ABSTRACT

A method of receiving a sounding reference signal (SRS) in a wireless communication system supporting multiple component carriers by a base station is provided. The method includes determining periodic SRS (P-SRS) transmission or aperiodic SRS (A-SRS) transmission about at least one serving cell (SCell) to be configured for a user equipment (UE), transmitting a triggering message including an activation or deactivation of the at least one SCell and indicating information for the A-SRS transmission according to the determination, and receiving an A-SRS from the UE through an activated SCell from among the at least one SCell configured in the UE. Uplink scheduling for an additional secondary serving cell and data communication through the uplink scheduling can be performed rapidly, as compared with a scheme using only a periodic SRS.

20 Claims, 16 Drawing Sheets

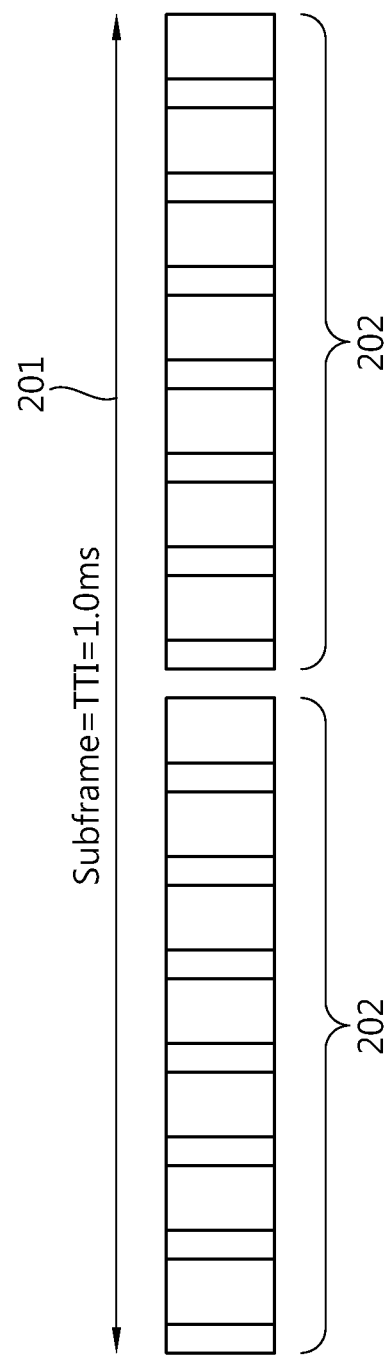

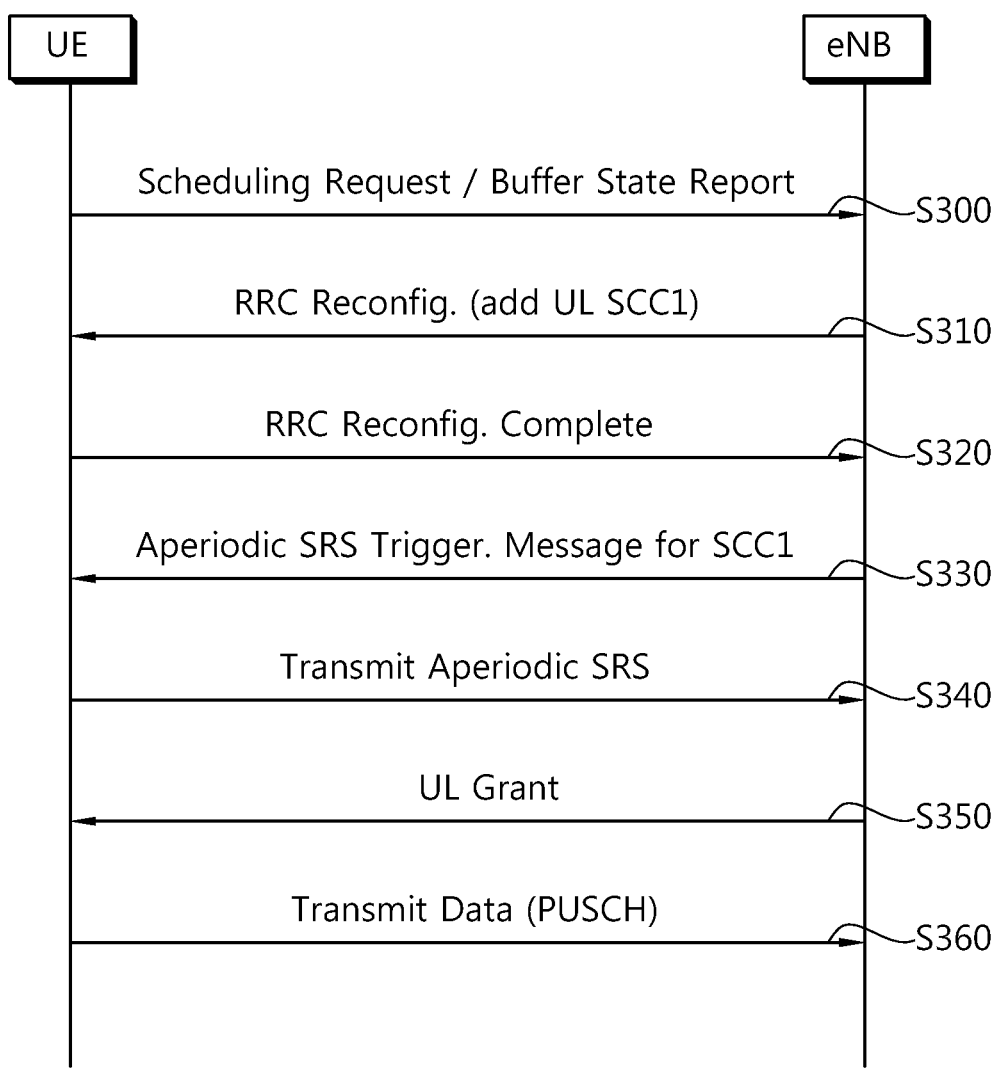

FIG. 4

| | | | |
|---|---|---|---|
| A | A-SRS Trigger. Flag(Field, Indic.) | A-SRS band allocation information | Transmission subframe allocation information |

| | | | |
|---|---|---|---|
| B | A-SRS Trigger. Flag(Field, Indic.) | UL grant information | UL control information |

| | | |
|---|---|---|
| C | MAC Subheader (LCID of A-SRS) | A-SRS band allocation information & Transmission subframe allocation information |

| | | |
|---|---|---|
| D | MAC Subheader (UL CC act/deact) | Activation/Deactivation configuration information |

APPARATUS AND METHOD FOR TRANSMITTING SOUNDING REFERENCE SIGNAL IN WIRELESS COMMUNICATION SYSTEM SUPPORTING MULTIPLE COMPONENT CARRIERS

CROSS-REFERENCE TO RELATED APPLICATIONS

This application claims priority from and the benefit under 35 U.S.C. §119 of Korean Patent Application No. 10-2010-0041154 filed on May 1, 2010 and Korean Patent Application No. 10-2010-0077971 filed on Aug. 12, 2010, both of which are incorporated by reference for all purposes as if fully set forth herein.

BACKGROUND

1. Field

This disclosure is directed to a wireless communication system and, more particularly, to a method of aperiodically or periodically transmitting a sounding reference signal in a wireless communication system supporting a plurality of component carriers, a base station and user equipment.

2. Discussion of the Background

Current mobile communication systems, such as 3GPP (3$^{rd}$ Generation Partnership Project), LTE (Long Term Evolution), LTE-A (LTE Advanced), and IEEE (The Institute of Electrical and Electronics Engineers) 802.16, are high-speed and high-capacity communication systems capable of transmitting and receiving data, such as video and radio by a voice-based service. In these mobile communication systems, an error detection scheme for technology capable of transmitting a large amount of data complying with a wired communication network, minimized information loss, and improved system transmission efficiency includes certain elements.

Furthermore, in several current communication systems, through uplink and downlink, the use of several types of reference signals for providing information about a communication environment and other information is used.

For example, in the LTE system, a User Equipment (hereinafter referred to as UE) sends a Sounding Reference Signal (hereinafter referred to as an 'SRS') (i.e., a reference signal used to estimate an uplink channel state) to an eNB, and an eNB sends a Cell-specific Reference Signal (hereinafter referred to as a 'CRS') (i.e., a reference signal used to estimate a downlink channel state) to a UE every subframe.

In addition, reference signals for channel estimation, and so on are periodically generated by, in general, an apparatus for transmitting the reference signals (for example, UE in the case of an uplink reference signal and an eNB in the case of a downlink reference signal).

Unlike a communication system that uses one carrier composed of one frequency band, a scheme capable of using a plurality of Component Carriers (hereinafter referred to as a 'CC') is also being explored.

In a communication system using a plurality of CCs, each of the CCs may function as one cell. A detailed scheme for transmitting a channel estimation reference signal for each CC has not yet been defined.

SUMMARY

Exemplary embodiments of the present invention provide SRS transmission in which aperiodic SRS transmission, periodic SRS transmission, or periodic SRS transmission and aperiodic SRS transmission in a wireless communication system supporting multiple CCs.

Another exemplary embodiment of the present invention provides selective SRS transmission in which aperiodic SRS transmission, periodic SRS transmission, or periodic SRS transmission and aperiodic SRS transmission coexisted in a wireless communication system supporting multiple CCs.

Yet another exemplary embodiment of the present invention provides signaling technology for selectively controlling SRS transmission in a wireless communication system supporting multiple CCs.

Yet another exemplary embodiment of the present invention provides technology in which a UE aperiodically or aperiodically transmits an SRS for a secondary serving cell by receiving a periodic or aperiodic SRS transmission instruction message for the secondary serving cell, determined using specific parameters, from an eNB.

Further yet another exemplary embodiment of the present invention provides aperiodic SRS transmission via an activated serving cell.

Further yet another exemplary embodiment of the present invention provides aperiodic SRS transmission using activation/deactivation of serving cells.

Further yet another exemplary embodiment of the present invention provides L1/L2/L3 messages for selectively controlling the transmission of an SRS and instructing the transmission of a selected SRS by taking an UL transmission situation into account in a wireless communication system in which a plurality of CCs is operated.

Further yet another exemplary embodiment of the present invention provides a message, instructing an SRS to be aperiodically transmitted, and an SRS transmission signaling scheme of a UE in a wireless communication system in which a plurality of CCs is operated.

Further yet another exemplary embodiment of the present invention provides a scheme for transmitting a message, instructing additional transmission of an aperiodic SRS in addition to the transmission of a periodic SRS and a signaling scheme in a wireless communication system in which a plurality of CCs is operated.

Further yet another exemplary embodiment of the present invention provides to trigger aperiodic SRS transmission and/or periodic SRS transmission based on activation/deactivation of serving cells.

According to an embodiment, a method of receiving a sounding reference signal (SRS) in a wireless communication system supporting multiple component carriers by a base station is provided. The method includes determining periodic SRS (P-SRS) transmission or aperiodic SRS (A-SRS) transmission about at least one serving cell (SCell) to be configured for a user equipment (UE), transmitting a triggering message including an activation or deactivation of the at least one SCell and indicating information for the A-SRS transmission according to the determination, and receiving an A-SRS from the UE through an activated SCell from among the at least one SCell configured in the UE.

According to another embodiment, a method of receiving a sounding reference signal (SRS) in a wireless communication system supporting multiple component carriers by a base station is provided. The method includes determining periodic SRS (P-SRS) transmission or aperiodic SRS (A-SRS) transmission about at least one serving cell (SCell) to be configured for a user equipment (UE), transmitting a triggering message including an activation or deactivation of the at least one SCell and indicating information for the A-SRS transmission according to the determination, and receiving an A-SRS from the UE through an activated SCell from among the at least one SCell configured in the UE.

According to yet another embodiment, a base station for receiving an SRS in a wireless communication system supporting multiple component carriers is provided. The base station includes a transmission mode determination unit configured for determining P-SRS transmission or A-SRS transmission for at least one SCell configured in a user equipment, a message transmission unit configured for generating a triggering message for the A-SRS transmission or a triggering message for the P-SRS transmission based on the determination of the transmission mode determination unit and configured for transmitting the generated triggering message to the user equipment, each of the triggering message for the A-SRS transmission and the triggering message for the P-SRS transmission including an activation or deactivation of the at least one SCell, and an SRS reception unit configured for receiving an A-SRS or a P-SRS from the user equipment through an activated SCell from among the at least one SCell configured in the user equipment.

According to yet another embodiment, a user equipment for transmitting an SRS in a wireless communication system supporting multiple component carriers is provided. The user equipment includes a parameter processing unit configured for transmitting at least one of a scheduling request for uplink resource allocation, a BSR for data, and information on handover to a base station, an SCell configuration unit configured for receiving, from the base station, reconfiguration information about at least one SCell based on the at least one of a scheduling request for uplink resource allocation, a BSR for data and information on handover and configured for reconfiguring the at least one SCell, a message reception unit configured for receiving a triggering message for the A-SRS transmission or a triggering message for the P-SRS transmission from the base station, each of the triggering message for the A-SRS transmission and the triggering message for the P-SRS transmission including an activation or deactivation of the at least one SCell, and an SRS transmission configured for transmitting an A-SRS or a P-SRS to the base station through an activated SCell from among the at least one SCell.

Additional features of the invention will be set forth in the description which follows, and in part will be apparent from the description, or may be learned by practice of the invention.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 2a, FIG. 2b and FIG. 2c are a subframe and a time slot structure for data transmission according to an exemplary embodiment.

FIG. 3 shows the flow of a signal according to an exemplary embodiment.

FIG. 4 illustrates the format of an A-SRS triggering message according to an exemplary embodiment.

DETAILED DESCRIPTION OF THE ILLUSTRATED EMBODIMENTS

Figure 1:
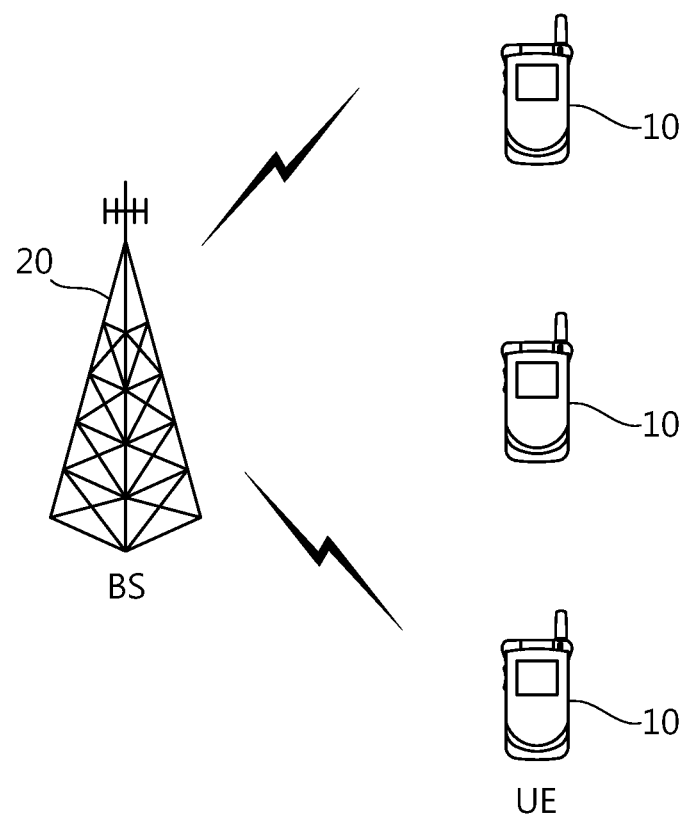
FIG. 1 is a diagram schematically showing a wireless communication system according to an exemplary embodiment.

Hereinafter, embodiments of the present invention will be described in more detail with reference to the accompanying drawings so that they can be readily implemented by those skilled in the art.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, 'at least one of each' will be interpreted to mean any combination the enumerated elements following the respective language, including a combination of multiples of the enumerated elements. For example, 'at least one of X, Y, and Z' will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

In the disclosure, terms, such as first, second, A, B, (a), and (b), may be used. The terms are used for merely discriminating the corresponding elements from other elements. The corresponding elements are not limited in their essence, sequence, or precedence by the terms.

In the disclosure, a wireless communication network will be described, and an operation performed in the wireless communication network may be performed in a component (e.g., a base station) of the system administering the wireless communication network to control the network and to transmit data, or may be performed in a mobile station (MS) connected to the corresponding wireless network. However, the network's operation is not limited to these stations.

FIG. 1 is a diagram schematically showing a wireless communication system according to an exemplary embodiment.

The wireless communication systems are widely used in order to provide various communication services, such as voice and packet data.

Referring to FIG. 1, the wireless communication system includes UEs 10 and an eNB 20. Periodic or aperiodic SRS transmission technology may be applied to the UEs 10 and the eNB 20.

In this specification, the UE 10 is a comprehensive concept referring to a user UE in wireless communication and may be interpreted as, but not limited to UEs in WCDMA, LTE, and HSPA. Other examples include a mobile station (MS), a user terminal (UT), a subscriber station (SS), and a wireless device in GSM.

The eNB 20 or a cell may refer to a fixed station communicating with the UE 10, and it may also be called a Node-B, an evolved Node-B (eNB), a base transceiver system (BTS), an access point, a relay node, a femto eNB, or a home eNB.

Thus, in this disclosure, the eNB 20 or the cell may be interpreted as indicating an area covered by a BSC (Base Station Controller) in CDMA and by a NodeB in WCDMA and covering various coverage regions, such as mega cell, macro cell, micro cell, pico cell, femto cell, and relay node communication ranges.

In this disclosure, the UE 10 and the eNB 20 are used as technology to describe two kinds of transmission and reception subjects.

There may be no limit to multiple access schemes applied to the wireless communication system. For example, a variety of multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA, may be used.

Furthermore, a TDD (Time Division Duplex) scheme in which uplink transmission and downlink transmission are performed at different times or a FDD (Frequency Division Duplex) scheme in which uplink transmission and downlink transmission are performed using different frequencies may be used.

Embodiments of the present invention may be applied to the asynchronization wireless communication field, evolved into LTE (Long Term Evolution) and LTE-advanced from GSM, WCDMA, and HSPA, and the synchronization wireless communication field evolved into CDMA, CDMA-2000, and UMB from GSM, WCDMA, and HSPA. The present disclosure should not be interpreted as being limited to or restricted by a specific wireless communication field and should be interpreted as including all technological fields to which the spirit of the present invention can be applied.

The wireless communication system to which embodiments of the present invention are applied may support uplink HARQ or downlink HARQ or both, and it may use a CQI (channel quality indicator) for link adaptation. Furthermore, multiple access schemes for downlink transmission and uplink transmission may differ from each other. For example, OFDMA (Orthogonal Frequency Division Multiple Access) may be used in downlink transmission, and SC-FDMA (Single Carrier-Frequency Division Multiple Access) may be used in uplink transmission.

The layers of a radio interface protocol between a UE and a network may be classified into a first layer L1, a second layer L2, and a third layer L3 on the basis of three lower layers of an Open System Interconnection (OSI) widely known in the communication systems. The physical layer belonging to the first layer provides information transfer service using a physical channel.

In the wireless communication system to which the embodiments are applied, one radio frame may include 10 subframes, and one subframe may include two slots.

A basic unit for data transmission is a subframe, and the scheduling of downlink or uplink may be performed for each subframe. One slot may include a plurality of OFDM symbols in the time domain and at least one subcarrier in the frequency domain. One slot may include 7 or 6 OFDM symbols.

For example, a subframe may include two slots, and each of the slots may include 7 symbols in the time domain and 12 subcarriers, or subcarriers in the frequency domain. A time-frequency domain, which may be defined by one slot as described above may be called a resource block (RB), but not limited thereto.

Figure 2B:
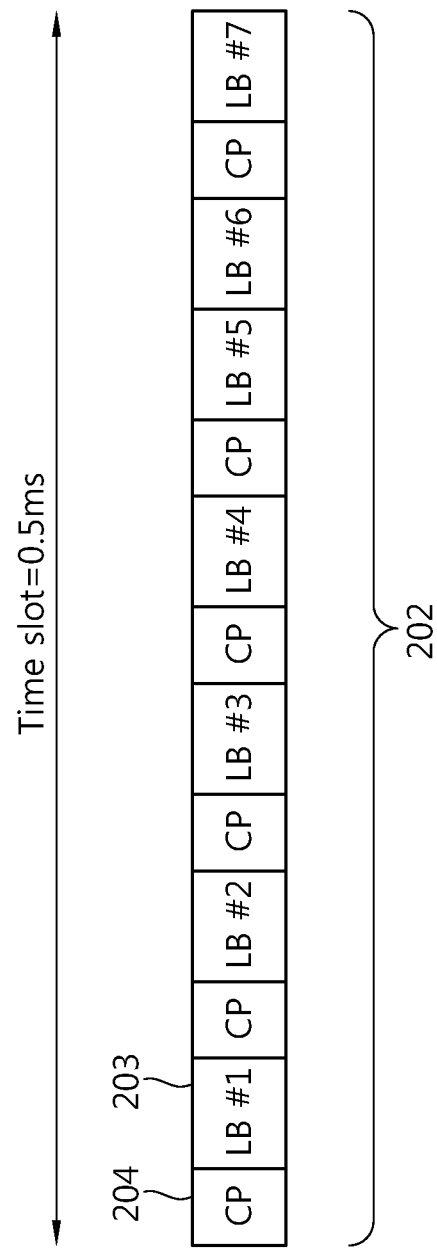
Figure 2C:
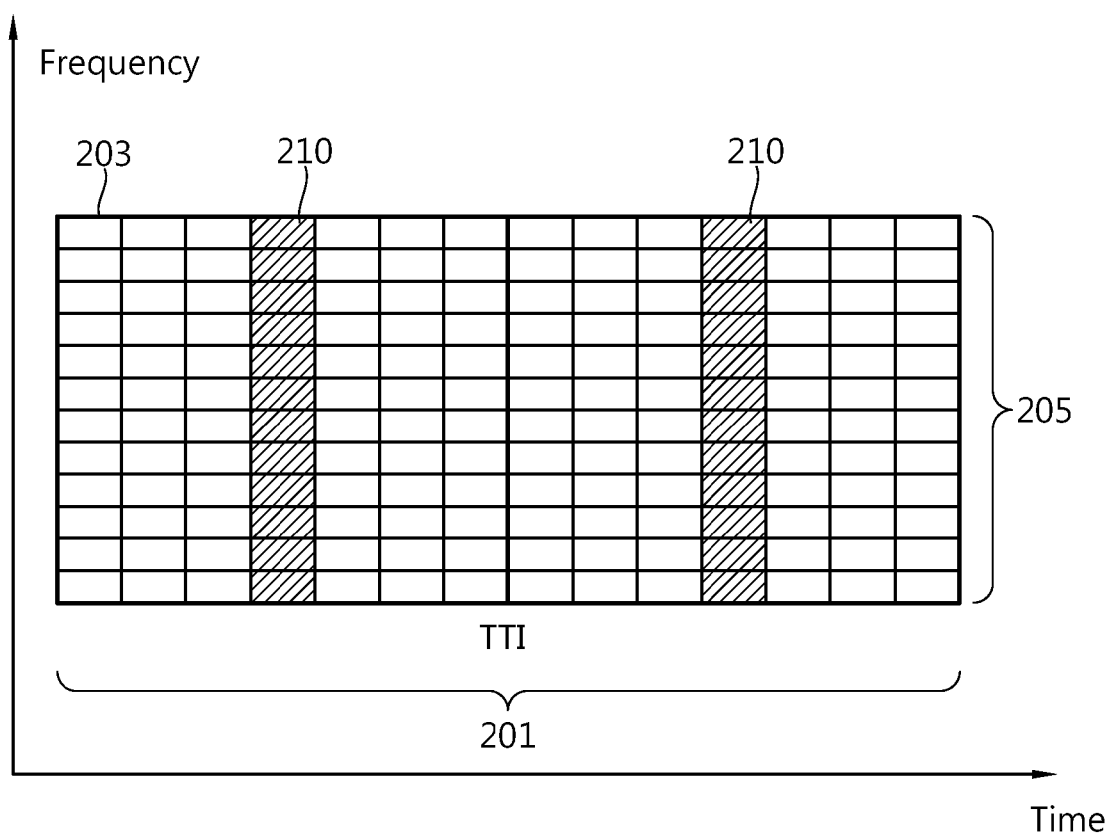

FIG. 2a, FIG. 2b and FIG. 2c illustrate a subframe and a slot structure for data transmission according to an exemplary embodiment.

Referring to FIG. 2a, the transmission time of a radio frame includes a subframe of 1.0 ms or a transmission time interval (hereinafter referred to as a 'TTI'). The terms 'TTI' and 'subframe' may be used interchangeably. The radio frame has a length of 10 ms and includes 10 TTIs.

Referring to FIG. 2b, a TTI is a basic transmission unit in which one TTI includes two time slots 202, and each of the time slots has a duration of 0.5 ms. The time slot includes 7 long blocks (LB) 203 for symbols. The LB includes a plurality of cyclic prefixes (CPs) 204. In summary, one TTI or subframe may include 14 LB symbols, but this disclosure is not limited to this frame, subframe, or time slot structure.

Referring to FIG. 2c, each TTI or subframe includes 14 symbols 203 in the time domain.

Furthermore, the entire system bandwidth of 20 MHz is split or classified into subcarriers 205 of different frequencies. In the shown example of FIG. 2c, 12 consecutive subcarriers are constructed within one TTI, and a region including 14 symbols in the time domain and 12 subcarriers in the frequency domain may be called a resource block (hereinafter referred to as an 'RB').

For example, the bandwidth of 10 MHz within 1 TTI may include 50 RBs in the frequency domain.

Each lattice space constituting at least one RB may be called a resource element (hereinafter referred to as an 'RE'). A total of 14×12=168 REs may exist in each subframe or RB of the above structure.

However, an embodiment of the present invention is not limited to the subframe and the time slot structure or the transmission data format shown in FIGS. 2a to 2c, and specific data formats having other structures may be used.

In an LTE communication system, a DMRS (demodulation reference signal) and an SRS (Sounding Reference Signal) may be defined in the uplink. Furthermore, a CRS (cell-specific reference signal), an MBSFN-RS (Multicast/Broadcast over Single Frequency Network Reference Signal), and a UE-specific reference signal may be defined in the downlink.

A UE sends an SRS (i.e., a reference signal for an uplink channel estimation which may be viewed as a reference signal) to an eNB in order to provide uplink channel information to the eNB. The SRS, in this case, has a similar function to a pilot channel.

In this specification hereinafter, an SRS which is an example of a channel estimation reference signal is disclosed.

The SRS, in addition to providing a band used by each UE, may also provide uplink channel information about an available band to an eNB. That is, an SRS for all subcarrier bands or an SRS for a subcarrier band in which data information is primarily transmitted may have to be transmitted.

An SRS sequence may be generated according to Equation 1 below, and the generated SRS sequence is transmitted according to a subframe configuration, such as that shown in Table 1 below, via resource mapping according to specific criteria.

$$r^{SRS}(n) = r_{u,v}^{(\alpha)}(n) = e^{j\alpha n} \bar{r}_{(u,v)}(n) \quad 0 \le n \le M_{sc}^{RS} \quad \text{[Equation 1]}$$

$M_{sc}^{RS} = mN_{sc}^{RB}$ is the length of a reference signal sequence, $1 \le m \le N_{RB}^{max,UL}$, u is a PUCCH sequence group number, v is a base sequence number, and a cyclic shift (CS) is $$\alpha = 2\pi \frac{n_{SRS}^{cs}}{8} \cdot n_{SRS}^{cs}$$

is one integer value of 0 to 7 and is set for each UE by means of an upper layer.

TABLE 1

| srsSubframeConfiguration | Binary | Configuration period (subframes) | Transmission offset (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0.1} |
| 8 | 1000 | 5 | {2.3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | Inf | N/A |

Table 1 above shows an example of the subframe configuration of an FDD SRS. Each configuration (srsSubframeConfiguration) is defined by 4 bits, and has a corresponding transmission cycle and an offset of an actual transmission subframe.

For example, if the srsSubframeConfiguration value is 8 (1000 in binary), the SRS is transmitted in second and third subframes every 5 subframes. The SRS may be transmitted in the last symbol of each subframe, but not limited thereto. According to the SRS configuration, such as that shown in Table 1, an SRS is periodically transmitted for each cell (or eNB) or for each radio frame or transmission cycle.

In a wireless communication system supporting only a single carrier, an SRS for the single carrier may be transmitted on the basis of Equation 1 and Table 1 above.

In order to increase the transfer rate, however, technology for extending the bandwidth has been developed, and a unit carrier that may be owned by a communication UE for such bandwidth extension is called a CC (component carrier). Accordingly, a scheme for aggregating multiple CCs is disclosed.

In other words, a plurality of conventional CCs of 20 MHz may be aggregated and used. For example, 5 CCs may be aggregated and extended to produce a bandwidth having a maximum of 100 MHz. Technology for aggregating a plurality of CCs as described above is called a carrier aggregation. Frequency bands to which CCs may be allocated may or may not be contiguous.

In relation to the carrier aggregation, a plurality of CCs may be classified into three kinds; a backward compatible carrier, non-backwards compatibility, and an extension carrier according to the characteristic.

The backwards compatible carrier (hereinafter referred to as a 'compatible carrier' or a 'BC') is a carrier which may be applied to UEs of all the existing LTE versions. The BC may be operated as a single (independently) carrier or may be operated as a part of a carrier aggregation. In TDD (Time Division Duplex), uplink and downlink have the same bandwidth and position. Furthermore, in FDD (Frequency Division Duplex), uplink and downlink may be cell specific and may exist in pairs.

The non-backwards compatibility carrier (hereinafter referred to as an 'incompatible carrier' or an 'NBC') is a carrier which cannot access UEs according to the existing communication systems and may be operated solely (independently) if it is generated from a duplex distance, and alternatively may be operated as only part of a carrier aggregation.

Furthermore, the extension carrier (or hereinafter referred to as an 'ExC') may not be operated solely (independently) and is used for part of at least one CC set. The extension carrier or ExC is used for only bandwidth extension.

In the multiple CCs environments, one CC through which a UE is initially connected (or RRC-connected) to a UE, from among CCs is called a primary CC (hereinafter referred to as a 'PCC' or 'primary CC').

Preferably, the PCC is used as a special CC for managing a plurality of CCs of UEs received from an eNB, performing a connection (or RRC connection) management function responsible for signaling, managing UE context information (i.e., access information related to a UE), and managing a security key value for a security configuration between UEs and an eNB, but not limited to the above terms or functions.

The PCC may exclusively exist in an activation state, if it is connected to a UE and is in the RRC connection mode.

In this disclosure, in addition to the PCC through which a UE is initially connected (or RRC-connected) to a UE from among several CCs, CCs may also be allocated to the UEs that are secondary CCs (hereinafter referred to as 'SCCs'). Preferably, the SCC is a carrier extended for additional resource allocation to a UE, in addition to the PCC, and may be divided into an activation state or a deactivation state.

In this specification, the SCC is may be used to include all CCs other than the PCC, from among multiple CCs. If a UE configures some of SCCs and activates the relevant SCCs, the relevant SCCs enter into a state in which data can be transmitted and received through the relevant SCCs.

Furthermore, each SCC may be separately allocated to downlink (or hereinafter referred to as 'DL') or uplink (or hereinafter referred to as 'UL'), the allocation occurring before use.

A serving cell refers to a cell providing service to a UE. A neighboring cell refers to a cell which is adjacent to a serving cell geographically or on the frequency band. In order to transmit and receive packet data through a specific cell, a UE first completes the configuration of a specific cell or CC. Here, the term 'configuration' means a state in which system information to transmit and receive data to and from a relevant cell or CC has been completely received.

For example, the configuration may include the entire process of receiving common physical layer parameters for data transmission and reception, MAC layer parameters, or parameters for a specific operation in the RRC layer. A configuration cell or CC means a state in which packets can be instantly transmitted and received if signaling information, indicating that packet data can be transmitted, is received.

Meanwhile, a cell of a configuration state may exist in the activation or deactivation state. The reason why the configuration state is divided into the activation and deactivation states is to minimize the consumption of a battery of a UE by allowing the UE to monitor or receive a control channel (i.e., PDCCH) and a data channel (i.e., PDSCH) during the activation state. Here, an initial state related to activation right after the configuration is deactivation.

Activation means that the transmission or reception of traffic data is being performed or is in a ready state. A UE may monitor, blind-decode, or receive the control channel (i.e., PDCCH) and the data channel (i.e., PDSCH) of an activated cell in order to check whether there are resources (e.g., the frequency and the time) allocated thereto. Furthermore, activation refers to a state in which a UE can measure channel quality.

Deactivation means that the transmission or reception of traffic data is impossible or difficult, but measurement or the transmission and reception of at least minimal information may be possible. A UE may receive system information (SI) in order to receive packets from a deactivation cell. On the other hand, a UE does not monitor, blind-decode, or receive the control channel (i.e., PDCCH) and the data channel (i.e., PDSCH) of a deactivated cell in order to check whether there are resources (e.g., the frequency and the time) allocated thereto. Furthermore, deactivation refers to a state in which a UE cannot or find it difficult to measure channel quality.

A primary serving cell (PCell) refers to one serving cell which provides security input and NAS mobility information in the RRC establishment or re-establishment state. At least one cell, together with a primary serving cell, may configure an aggregation of serving cells based on the capabilities of UEs. The at least one cell is called a secondary serving cell (SCell). The secondary serving cell may be variably allocated according to the amount of data to be transmitted or other conditions, but is not an essential element.

A downlink CC corresponding to a primary serving cell is called a downlink primary CC (hereinafter referred to as a 'DL PCC'), and an uplink CC corresponding to a primary serving cell is called an uplink primary CC (hereinafter referred to as an 'UL PCC'). Furthermore, in downlink, a CC corresponding to a secondary serving cell is called a downlink SCC (hereinafter referred to as a 'DL SCC'). In uplink, a CC corresponding to a secondary serving cell is called an uplink SCC (hereinafter referred to as an 'UL SCC'). The DL CC may correspond to one serving cell or may correspond to both a DL CC and an UL CC.

For example, a DL CC1 and an UL CC1 may be linked to construct a primary serving cell. Furthermore, a DL CC2 and an UL CC2 may be linked to construct one secondary serving cell, and a DL CC3 and an UL CC3 may be linked to construct another secondary serving cell. Accordingly, in a carrier system, communication performed between a UE and an eNB through a DL CC or an UL CC may have the same concepts as communication performed between a UE and an eNB through a serving cell. Accordingly, the activation or deactivation of a CC has the same concept as the activation or deactivation of a serving cell. For example, assuming that a serving cell 1 is composed of a DL CC1, the activation of the serving cell 1 has the same concept as the activation of the DL CC1. Assuming that a serving cell 2 is linked to a DL CC2 and an UL CC2, the activation of the serving cell 2 has the same concept as the activation of the DL CC2 and the UL CC2. Furthermore, a primary serving cell corresponds to a PCC (primary component carrier), and a secondary serving cell corresponds to an SCC (secondary component carrier).

In certain embodiments described in this disclosure, it is hereinafter assumed that communication between a UE and an eNB in multiple CCs systems is performed through a serving cell.

In a multi-CC environment, a UE may be RRC-connected to a primary serving cell as in the conventional single CC, and thus can send an SRS to the eNB using a scheme, such as that shown in Equation 1 and Table 1.

It is assumed that a UE performs RRC connection to all secondary serving cells like a primary serving cell. In this case, the UE may receive system information (SI) about each of the secondary serving cells, configure and activate the secondary serving cells, and send an SRS to a relevant secondary serving cell using a scheme, such as that shown in Equation 1 and Table 1. It may, however, cause unnecessary power consumption, latency, and so on for a UE. In other words, a UE using the same scheme as the scheme for transmitting an SRS to a primary serving cell in the state in which the UE is not guaranteed to use all secondary serving cells or secondary serving cells allocated thereto may increase unnecessary power consumption for the UE. It may also cause excessive latency for SRS transmission. Furthermore, if a UE is connected to a target eNB through a handover, the UE performs reconfiguration for a secondary serving cell. Even in this case, if the scheme for transmitting an SRS to a primary serving cell is applied to all the secondary serving cells, the handover may not be smoothly performed because of the time latency.

In an embodiment, an eNB determines whether to periodically or aperiodically transmit an SRS to a secondary serving cell additionally configured based on specific parameters and sends a message indicative of the determination to a UE, and the UE periodic or aperiodically transmits an SRS to a relevant secondary serving cell based on information included in the message.

In this disclosure hereinafter, expressions 'periodic SRS transmission' (or P-SRS transmission) has the same meaning as that an SRS for a specific secondary serving cell is periodically transmitted. Likewise, expressions 'aperiodic SRS transmission' (or A-SRS transmission) has the same meaning as that an SRS for a specific secondary serving cell is aperiodically transmitted.

An eNB may determine P-SRS transmission or A-SRS transmission to a secondary serving cell on the basis of eNB parameters and parameters received from a UE, generate an A-SRS triggering message instructing the A-SRS transmission (or P-SRS transmission) based on the determination, and send the generated A-SRS triggering message to the UE. The UE may aperiodically (or periodically) send an SRS to the secondary serving cell based on information included in the A-SRS triggering message.

Furthermore, if it is determined that P-SRS transmission (or A-SRS transmission) transmission is to be performed during the A-SRS transmission (or P-SRS transmission), the eNB may generate a P-SRS setup message or a P-SRS enable message (or A-SRS enable message) for the P-SRS transmission and send the generated P-SRS configuration or P-SRS enable message to the UE. The UE may additionally send an SRS to a relevant secondary serving cell periodically (or aperiodically).

The above process may be independently performed by an eNB and a UE. The A-SRS triggering message may also be called an A-SRS setup message or an A-SRS enable message. The P-SRS triggering message may also be called a P-SRS setup message or a P-SRS enable message. It is however to be noted that different terms or expressions having the same function and definition may also be used.

FIG. 3 shows the flow of a signal according to an exemplary embodiment.

Referring to FIG. 3, if a UE has data to be transmitted in uplink, the UE sends a Scheduling Request (hereinafter referred to as 'SR') to an eNB in order to request the eNB from UL resource allocation at step S300. Here, the UE may check the amount of arrived data in order to report the amount of data to be now transmitted in uplink and send a Buffer State Report (hereinafter referred to as a 'BSR') to the eNB.

The eNB determines whether to configure an additional secondary serving cell for the UE by checking the SR information or the BSR information or both received from the UE. Here, the eNB may determine whether to configure an additional secondary serving cell for the UE on the basis of not only the SR information or the BSR information or both, but also a loading factor for each of uplink CCs being now operated within the eNB, the bandwidth of each uplink CC, the number of UEs using the uplink CCs, the coverage of the uplink CC, and a power headroom report (PHR).

Here, the loading factor for each uplink CC may be defined as the used uplink bandwidth, as compared with the entire bandwidth of the relevant uplink(s). The bandwidth of each uplink CC may be defined as the size of a frequency allocated to each CC. The bandwidth of each uplink CC may be received through a broadcast channel. The number of UEs using a relevant uplink CC is taken into consideration because an SRS transmission cycle may be increased according to an increase in the number of UEs which will send an SRS, for example, if there are a lot of UEs within the relevant uplink CC. The coverage of an uplink CC is taken into consideration in order to guarantee the reception performance of an UE by allocating an additional secondary serving cell to the UE, if the reception performance of the UE is not guaranteed because the coverage of a primary serving cell now being used is small in the case of a UE placed at the edge of a cell. The power headroom may be defined as the remaining transmission power in which power now being used by a UE has been subtracted from a maximum transmission power for the UE. The UE reports the remaining transmission power for each CC, and the eNB determines whether to allocate an additional secondary serving cell to the UE by checking the remaining transmission power reported by the UE.

Furthermore, if the eNB determines to configure an additional secondary serving cell for at least one of the UE, the eNB selects an additionally configured secondary serving cell for allocating to the UE and informs the UE of the selected secondary serving cell. The eNB may inform the UE of the selected secondary serving cell by using an RRC reconfiguration message at step S310. The RRC reconfiguration message may include information about the additionally configured secondary serving cell or UE CC set information including the information about a secondary serving cell to be additionally configured. Here, the information about the additionally configured secondary serving cell may have an index information form of the additionally configured secondary serving cell. The RRC reconfiguration message may further include system information (SI) about the secondary serving cell to be additionally configured.

If the UE receives the RRC reconfiguration message, the UE interprets information included in the RRC reconfiguration message. The UE checks the information about the additionally configured secondary serving cell and performs a configuration procedure for the secondary serving cell. After the configuration procedure for the secondary serving cell is completed, the UE sends an RRC reconfiguration-complete message to the eNB at step S320.

The RRC reconfiguration-complete message includes a value identical to an RRC-transaction identifier value which has been set when the eNB sends the RRC reconfiguration message. When the RRC-transaction identifier value within the RRC reconfiguration-complete message transmitted by the UE is identical to a value within the RRC reconfiguration message transmitted by the eNB, the eNB determines that the RRC reconfiguration has been successfully completed. Here, the RRC-transaction identifier may be set to, for example to 2 bits.

Furthermore, the RRC reconfiguration-complete message may include CC set information, a flag for addition and removal, and additional secondary serving cell index information.

The secondary serving cell (re)configuration procedure at step S320 may be performed as follows, but not limited thereto.

For the secondary serving cell (re)configuration, the UE first determines whether valid system information for a relevant secondary serving cell has been secured.

The term 'valid system information' may refer to system information which has already been secured in a condition in which an amount of time, such as 3 hours, have not elapsed after the system information was received and a signal (e.g., a dedicated message, such as a paging message or an RRC message) related to system information update has not been received. If the valid system information is not secured, the UE may request the system information about the relevant secondary serving cell from the eNB. In response thereto, the eNB sends system information for the UE to additionally configure the relevant secondary serving cell through an RRC message. The system information on secondary serving cell received from the RRC message may be valid until the system information is modified by the eNB. Alternatively, the UE may receive system information, being broadcasted by the eNB through a downlink secondary serving cell connected to the relevant secondary serving cell, and secure the system information to additionally configure the relevant secondary serving cell.

Next, the UE configures the secondary serving cell using the secured valid system information.

That is, the UE extends the range of an uplink RF chain by the band of the relevant secondary serving cell or activates another RF chain capable of supporting the band of the relevant secondary serving cell.

Furthermore, the UE sets a contention-based random access scheme so that the scheme can be used. In order to use the random access scheme through the relevant secondary serving cell, the UE sets random access transmit power by taking pieces of information (e.g., the reception intensity of a pilot signal) measured through a DL CC lined to an UL CC through establishment configuration into consideration. Furthermore, the UE sets the range of a random access preamble sequence with reference to information within the system information received through the DL CC linked to an UL CC through establishment configuration into consideration. Furthermore, the UE sets time and frequency resources through which an available random access preamble will be transmitted with reference to the information within the system information.

After completing the secondary serving cell configuration procedure, the UE additionally adjusts uplink timing information. If the uplink timing information has the same uplink timing as another primary serving cell or another secondary serving cell which has already secured the uplink timing information, the UE shares the uplink timing information of the primary serving cell or the secondary serving cell. Alternatively, in the case where uplink timing information has to be newly set, the UE sets uplink timing information through a random access procedure.

After the step S320, the eNB determines whether to perform A-SRS transmission to the secondary serving cell (or Scell), additionally configured by the UE, on the basis of the SR information or the BSR information or information on handover or both received from the UE.

For example, the eNB may determine whether to perform the A-SRS transmission based on BSR information types which are classified into a short BSR, a truncated BSR, and a long BSR, whether to perform the A-SRS transmission based on information within a BSR (i.e., information about the amount of data that has not yet been transmitted), or whether to perform the A-SRS transmission by synthesizing the two kinds of pieces of information. Parameters for determining aperiodic transmission may include a factor to decide whether to perform handover.

The A-SRS transmission parameters for determining aperiodic transmission are illustrated to be the pieces of information, such as an SR, a BSR, or whether to perform handover, but not limited thereto. The A-SRS transmission parameters for determining aperiodic transmission may include all pieces of information on which a state about whether an SRS uses aperiodic transmission can be checked.

The short BSR refers to information about the amount of data within a buffer for one Logical Channel Group (hereinafter referred to as an 'LCG'). The short BSR includes an LCG ID (2 bits) (i.e., an indicator indicating one of a total of four LCGs) and a buffer size (6 bits) indicating the amount of data within the buffer.

The truncated BSR refers to information about a logical channel having the highest priority and the amount of data within a buffer for one LCG set using other logical channels, in the case where a BSR for one or more LCGs has to be transmitted. Accordingly, the truncated BSR may be set to have the same form as the short BSR.

The long BSR refers to information about the amount of data within a buffer for the total of four LCGs. Accordingly, the long BSR consists of four buffer sizes (6 bits) indicating the amount of data within a buffer for each LOG in ascending powers.

The three kinds of the BSRs described above are classified by LCID values listed in Table 2 below.

If the eNB determines to set an A-SRS, the eNB sends the A-SRS triggering message, together with the parameters to send the A-SRS, to the UE at step S330.

The A-SRS triggering message may be transmitted through a downlink (DL) secondary serving cell linked to a relevant UL secondary serving cell. The eNB may send the A-SRS triggering message to a UE through one of downlink (DL) CCs by inserting a CIF (carrier index field) irrespective of establishment configuration during a state that the UE has its cross CC scheduling activated.

The A-SRS triggering message may be transmitted through the PDCCH of an L1 layer, the MAC CE of an L2 layer, or the RRC message of an L3 layer. The RRC message may be transmitted through only a DL primary serving cell. In this case, the RRC message includes index information about a secondary serving cell to which the A-SRS triggering message is applied.

FIG. 4 illustrates the format of an A-SRS triggering message according to an exemplary embodiment.

Referring to FIG. 4, A is an example of a format of the A-SRS triggering message defined in the L1 layer. A-SRS configuration information, together with ID information, such as flag information, field information, or an indicator indicating that a PDCCH is A-SRS information, may be included in a PDCCH (Physical Downlink Control Channel) and then transmitted.

The A-SRS configuration information may include A-SRS band allocation information, transmission subframe allocation information, etc., but not limited thereto. As an example of the ID information, 1 bit may be allocated to the flag information indicating that the PDCCH is A-SRS information. Furthermore, 5 bits may be allocated to the field information indicating that the PDCCH is A-SRS information. Furthermore, the A-SRS band allocation information is information indicating the position of a frequency band in which an A-SRS will be transmitted, and 10 bits may be allocated to the A-SRS band allocation information. The transmission subframe allocation information is information about the time when a subframe in which an A-SRS will be transmitted is transmitted, and 10 bits may be allocated to the transmission subframe allocation information.

However, the bits allocated to the A-SRS band allocation information and to the transmission subframe allocation information are not limited to the above defined amounts, but may be variably set according to an A-SRS transmission scheme to be applied in a wireless communication system.

Furthermore, B is another example of the format of the A-SRS triggering message defined in the L1 layer. Flag information or field information, instructing A-SRS triggering, may be included in a PDCCH on which UL resource allocation (UL Grant) or UL control information is loaded and then transmitted. In the case of B, A-SRS configuration information is transmitted to a UE through an RRC message.

For example, 1 bit may be allocated to the flag information indicating A-SRS information, and the UL resource allocation (grant) information and UL control information mean resource allocation information used to send uplink data and control information.

C is another example of the format of the A-SRS triggering message defined in the L2 layer. An LCID indicating A-SRS information is included in an MAC subheader. A-SRS configuration information (A-SRS band allocation information and transmission subframe allocation information) may be included in a payload and then transmitted.

The LCID may be defined by Table 2 below, but not limited thereto.

That is, in an LCID definition scheme for an uplink sharing channel (UL-SCH) and an MAC CE (control element) as in Table 2, the LCID of 5 bits may be defined to include specific information according to its value. For example, if the LCID is 11001, it indicates that a relevant MAC CE is an MAC CE for A-SRS triggering. Furthermore, if the LCID is 11000, it indicates that a relevant MAC CE includes information about the activation or deactivation of a downlink serving cell.

If the LCID is set to 11000, the activation or deactivation of a relevant serving cell may be instructed by allocating 5 bits to an MAC payload and mapping each serving cell to each of the bits. For example, a secondary serving cell may be identified based on activation or deactivation information by allocating 4 bits to the payload. In this case, a primary serving cell may not be separately indicated because it is always activated.

TABLE 2

| Index | LCID values |
|---|---|
| 00000 | CCCH |
| 00001-01010 | Identity of the logical channel |
| 01011-10111 | Reserved |
| 11000 | DL CC Activation/Deactivation |

TABLE 2-continued

| Index | LCID values |
| --- | --- |
| 11001 | A-SRS triggering |
| 11010 | Power Headroom Report |
| 11011 | C-RNTI |
| 11100 | Truncated BSR |
| 11101 | Short BSR |
| 11110 | Long BSR |
| 11111 | Padding |

D is another example of the format of the A-SRS triggering message defined in the L2 layer. An LCID, indicating that a relevant MAC CE is information about the activation or deactivation of a serving cell, is included in an MAC subheader. Activation or deactivation configuration information (A-SRS band allocation information and transmission subframe allocation information) may be included in a payload and then transmitted. Alternatively, an A-SRS triggering message of the D format may include the activation or deactivation information of a serving cell itself.

The activation or deactivation of the serving cell may be defined as follows. The serving cell that has been activated has the following characteristics.

A UE maintains an RF characteristic for the frequency band of an activated serving cell. Thus, it is meant that the UE remains in a state in which it can send a data signal anytime through the frequency band of the activated serving cell.

If there is a set SRS, a UE restarts SRS transmission.

A UE sends a PUSCH to an activated serving cell based on UL grant information.

The serving cell that has been deactivated has the following characteristics.

A UE permits an RF character change for the frequency band of an activated serving cell. In other words, it is meant that the UE does not need to maintain the state in which it can send a data signal through the frequency band of the activated serving cell.

A UE does not send any SRS.

If UL grant information about a deactivated serving cell is received, a UE ignores the information.

The LCD, indicating that the A-SRS triggering message is a message of the D format (or including the activation or deactivation information of a serving cell) may be defined as in Table 3 below.

TABLE 3

| Index | LCID values |
| --- | --- |
| 00000 | CCCH |
| 00001-01010 | Identity of the logical channel |
| 01011-10101 | Reserved |
| 10110 | P-SRS enable |
| 10111 | UL CC Activation/Deactivation |
| 11000 | DL CC Activation/Deactivation |
| 11001 | A-SRS triggering |
| 11010 | Power Headroom Report |
| 11011 | C-RNTI |
| 11100 | Truncated BSR |
| 11101 | Short BSR |
| 11110 | Long BSR |
| 11111 | Padding |

Referring to Table 3, if the LCID is 10111, it instructs the activation or deactivation of an UL CC. Here, the activation or deactivation of a serving cell may be instructed by allocating 5 bits to an MAC payload and mapping each CC to each of the bits. In another example, an UL SCC may be identified based on the activation or deactivation information by allocating 4 bits to the payload. In this case, the UL PCC may not be separately indicated because it is always activated. In one such example, the LCID is illustrated not only to separately indicate the activation or deactivation of an UL CC and the activation or deactivation of a DL CC but also to indicate the activation or deactivation of a serving cell.

If a UE recognizes that a relevant MAC CE is the A-SRS triggering message of the D format (or that a relevant MAC CE includes activation or deactivation information about a serving cell or that a relevant MAC CE is itself an activation or deactivation information about the serving cell) based on an LCID, the UE activates or deactivates a primary serving cell or a secondary serving cell based on the activation or deactivation information about the serving cell and triggers A-SRS transmission. For example, if the activation or deactivation information about the serving cell indicates the activation of a specific secondary serving cell, the UE may change the state of the specific secondary serving cell from the deactivation state to the activation state and trigger A-SRS transmission to the specific secondary serving cell. Based on the description above, the A-SRS triggering message may be interpreted as the activation or deactivation information about the serving cell or the activation or deactivation information about the serving cell may be interpreted as the A-SRS triggering message. Accordingly, a scheduling problem generated because the time when a P-SRS is transmitted is delayed or A-SRS triggering is delayed can be solved through use of the specific secondary serving cell.

Furthermore, a scheduler may check that such an application is completed in a UE based on the activation or deactivation information of the serving cell in relation to a serving cell whose state is changed from the deactivation to the activation state based on the activation or deactivation information of the serving cell and then immediately send signaling, including A-SRS-related information defined in the L1 layer as in A or B of FIG. 4, to a UE.

The transmission reliability of the A-SRS triggering message having the format defined in A or B can be guaranteed in such a way that the UE can complete UL activation through the activation or deactivation information of the serving cell and apply UL grant information to the activated serving cell.

Furthermore, the scheduler may send UL activation or deactivation signaling and signaling, defined in the L2 layer as in C of FIG. 4, to a UE at the same time UE based on the activation or deactivation information of the serving cell in relation to a serving cell whose state is changed from the deactivation state to the activation state.

In other words, since the A-SRS triggering message of the format defined as in C and the activation or deactivation information of the serving cell are constructed of one MAC message and transmitted to a UE, the frequent transmission of a message may be reduced, and transmission reliability for an A-SRS can be guaranteed and improved.

In this case, the LCID value may be set to '11001' indicating A-SRS triggering or to '10111' instructing the activation or deactivation of a serving cell. Alternatively, two LCID values may be mapped to respective MAC subheaders or the MAC subheaders may be contiguously set and transmitted.

Figure 6:
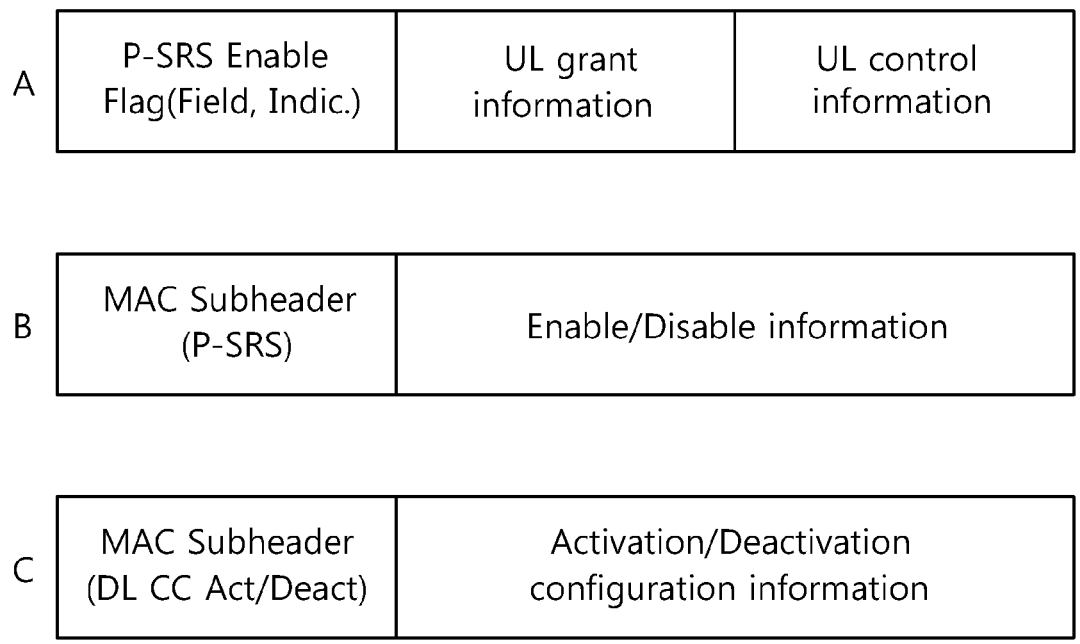
FIG. 6 illustrates the format of a P-SRS enable message according to an exemplary embodiment.

Furthermore, according to another example of the present invention, as an example of the format of the A-SRS triggering message defined in the L2 layer transmitted by the scheduler as shown in B of FIG. 6, an LCID indicating P-SRS enable information may be included in the MAC subheader, P-SRS enable or disable information (A-SRS band allocation information and transmission subframe allocation information) may be included in the payload, and then transmitted.

Accordingly, a UE interprets the P-SRS enable information and at the same time checks that the state of a serving cell or a secondary serving cell has changed from a P-SRS disable state to a P-SRS enable state, based on the P-SRS enable information and checks that the serving cell or the secondary serving cell has been subjected to A-SRS triggering. Accordingly, the LCID value for the MAC message may be set to '10110' indicating the P-SRS enable state and then transmitted.

Furthermore, as an example of the format of the A-SRS triggering message defined in the L3 layer, A-SRS configuration information (A-SRS band allocation information and transmission subframe allocation information) and A-SRS transmission start time-related information (i.e., system frame information, etc.), together with ID information (i.e., an indicator indicating that an RRC message is A-SRS information) may be included in the LCID and then transmitted. Here, the RRC message may be transmitted only through a primary serving cell. In this case, index information about a secondary serving cell to which an A-SRS triggering message is applied is included in the RRC message.

In the present embodiment, if a UE sends an A-SRS based on A-SRS configuration information, the UE may map the resources of an A-SRS signal and configure a subframe using several A-SRS transmission parameters which is defined specially or similarly to the existing scheme.

As examples of the A-SRS transmission parameters, an A-SRS-BandwidthConfig parameter (i.e., A-SRS band configuration parameter), an A-SRS-SubframeConfig parameter (i.e., A-SRS subframe configuration parameter), an A-SRS-Bandwidth parameter ($B_{A-SRS}$) (i.e., a parameter indicating an A-SRS band, an A-SRS-ConfigIndex parameter ($I_{A-SRS}$) (i.e., a parameter indicating an A-SRS configuration index), and so on may be used, but not limited thereto. Alternatively, parameters differently defined or expressed may also be used.

Referring back to FIG. 3, if the A-SRS triggering message is received, the UE calculates the time when the A-SRS will be transmitted on the basis of the A-SRS configuration information which is received before the A-SRS triggering message is received or simultaneously with the A-SRS triggering message. If information related to an A-SRS transmission start time is received from the eNB, the UE determines the start time based on the information. The UE sends the A-SRS on the determined time at step (S340). For example, if the A-SRS triggering message has a format, such as the D format of FIG. 4, if the A-SRS triggering message is received, the UE activates a serving cell indicated by the A-SRS triggering message and sends the A-SRS to the eNB based on the A-SRS configuration information.

Referring to FIG. 3, the UE checks that reconfiguration one more SCells based on the received reconfiguration information from the eNB (S310) and the UE receives an A-SRS triggering message including an activation or deactivation of the one more SCells (S330), and the UE transmits A-SRS via an activated SCell (S340), herein, the UE may receive A-SRS configuration information including A-SRS band allocation information and transmission subframe allocation information for the A-SRS transmission before receiving the A-SRS triggering message via RRC message (S310).

An example of a method of calculating the A-SRS transmission time is described below.

For example, if the transmission band of an A-SRS is ¼ of the entire band and the A-SRS has to be transmitted in a fourth subframe, a UE sends the A-SRS through different bands as much as ¼ of the entire band over four times from the earliest subframe of subframes allocated based on the time which has elapsed by 2 TTIs (2 ms) from the time when the A-SRS triggering message is received.

Next, the transmission time may be calculated according to the type or transmission layer of the A-SRS triggering message.

For example, when A-SRS configuration information is received through a PDCCH, the UE may calculate A-SRS transmission time on the basis of the time which has elapsed by 1 TTI (1 ms) or more from the time when the A-SRS configuration information was received.

Furthermore, if A-SRS configuration information is received through an MAC CE, the UE may calculate A-SRS transmission time on the basis of the time which has elapsed by 4 TTIs (4 ms) to 36 TTIs (36 ms) or more from the time during the A-SRS configuration information being received. The reference time may be changed and determined according to an HARQ operation (as exemplified below).

As an example of the HARQ operation, a maximum retransmission number may be 3, and the time to receive a retransmitted MAC CE message at the time of the first retransmission is 8 ms. Accordingly, there may be 24 ms of additional time.

Furthermore, when A-SRS configuration information is received through an RRC, the UE may calculate A-SRS transmission time on the basis of the time which has elapsed by 15 TTIs (15 ms) or more from the time when the A-SRS configuration information was received. The reference time may be changed and determined according to an HARQ operation.

As an example of the ARQ operation a maximum retransmission number may be 2, and the additional time to receive a retransmitted RRC message at the time of the first retransmission may be variable according to an ARQ scheme applied in the RLC. Accordingly, a variable additional time may be 15 ms, which is the time to first send the RRC.

Next, if the eNB receives the A-SRS, the eNB obtains uplink channel information based on the received A-SRS. The eNB generates scheduling information about the additionally configured secondary serving cell on the basis of the obtained channel information. The eNB sends the generated scheduling information to the UE using an UL grant message at step S350.

At step S360, the UE sends data through the secondary serving cell additionally configured based on the uplink scheduling information (UL grant information) at step S360.

Figure 5:
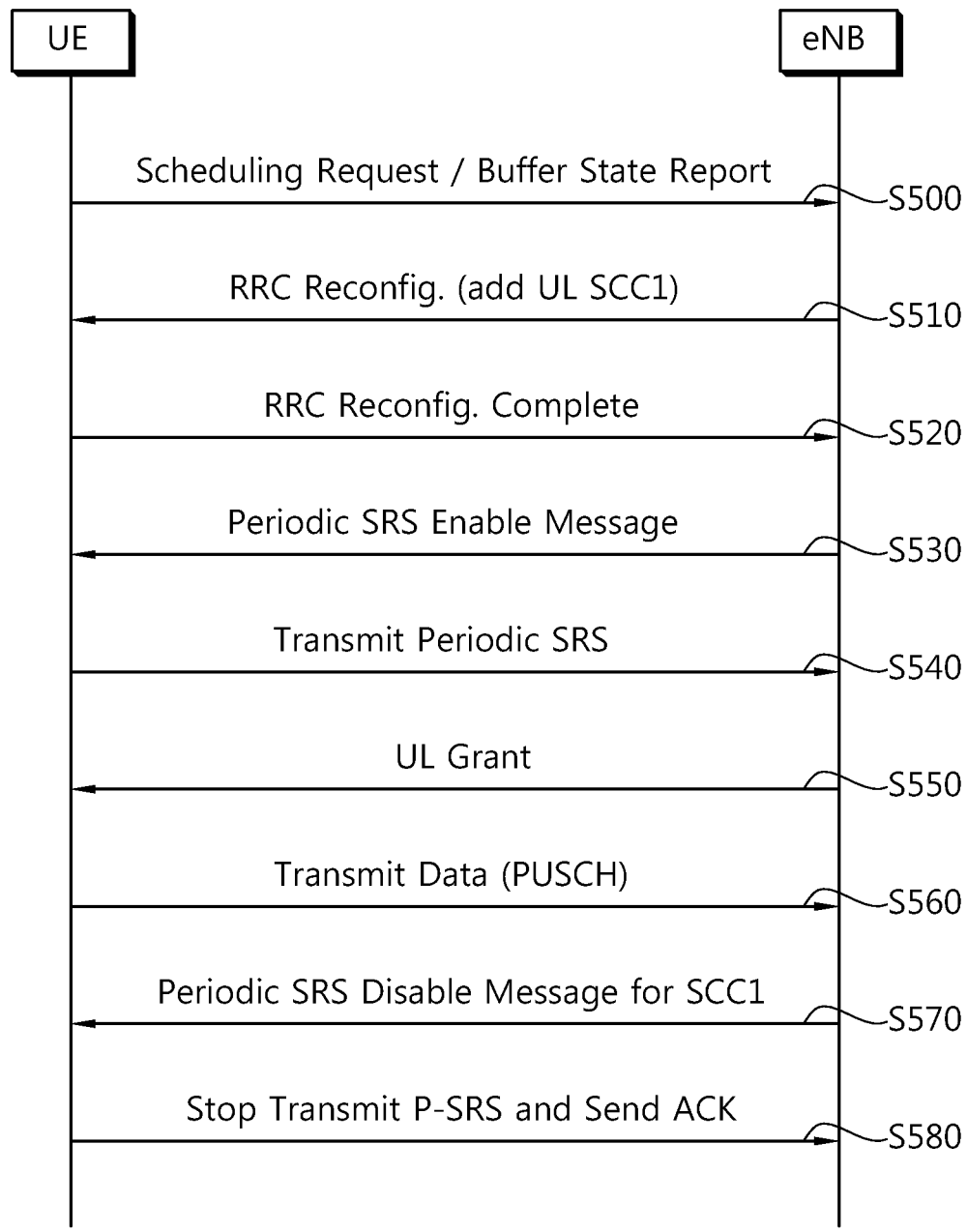
FIG. 5 shows the flow of a signal in which a periodic SRS (hereinafter referred to as a 'P-SRS') is transmitted through an additionally configured uplink SCC according to an exemplary embodiment.

FIG. 5 shows the flow of a signal according to an embodiment in which a P-SRS is transmitted through an additionally configured uplink SCC.

The steps S500, S510, and S520 of FIG. 5 are similar to the step S300, S310, and S320 of FIG. 3, respectively.

More particularly, first, when a UE includes data to be transmitted in uplink, the UE sends an SR to an eNB in order to request UL resource allocation. Here, the UE may check the amount of arrived data in order to report the amount of data to be now transmitted in uplink and send a BSR to the eNB at step S500.

The eNB determines whether to configure an additional secondary serving cell for the UE by checking the SR information or the BSR information or both received from the UE. Here, the eNB may determine whether to configure an additional secondary serving cell for the UE by further taking a loading factor for each of uplink CCs that are operated within the eNB, the bandwidth of each uplink CC, the number of UEs using the uplink CCs, the coverage of the uplink CC, and a power headroom report (PHR) into account.

Here, the meanings and definitions of the loading factor for each uplink CC, the bandwidth of each uplink CC, the number of UEs within a relevant uplink CC, the coverage of the uplink CC, and the power headroom report are similar to those of FIG. 3.

If the eNB determines to configure an additional secondary serving cell for the UE, the eNB selects an additionally configured secondary serving cell for the UE and informs the UE of the selected secondary serving cell. Here, the eNB may inform the UE of the selected secondary serving cell using an RRC reconfiguration message. The RRC reconfiguration message may include information about a secondary serving cell to be additionally configured or UE CC set information including the information about a secondary serving cell to be additionally configured. Here, the information about a secondary serving cell to be additionally configured may have an index information form of the secondary serving cell to be additionally configured. The RRC reconfiguration message may further include system information (SI) about the secondary serving cell to be additionally configured at step S510.

Next, if the UE receives the RRC reconfiguration message, the UE interprets information included in the message. The UE checks the information about the secondary serving cell additionally configured by the eNB at step S510 and performs a configuration procedure for the secondary serving cell. After the configuration procedure for the secondary serving cell is completed, the UE sends an RRC reconfiguration-complete message to the eNB at step S520.

The secondary serving cell (re)configuration procedure at step S520 is similar to the secondary serving cell (re)configuration procedure at step S320. Here, after the secondary serving cell is configured, the UE sets uplink timing according to an additional procedure. Furthermore, the UE sets a P-SRS. The setup of the P-SRS will be described in detail below.

After the step S520, the eNB determines whether to set an A-SRS or a P-SRS for the secondary serving cell, additionally configured by the UE, on the basis of the SR information or the BSR information or both (i.e., A-SRS transmission parameters) received from the UE. For example, the eNB may determine whether to set the A-SRS or the P-SRS based on a BSR information type classified into a short BSR and a long BSR, based on other information within the BSR, or based on a combination of the two kinds of pieces of information. The A-SRS transmission parameters may include information about whether to perform handover.

If, as a result of the determination, the eNB determines not to set the A-SRS, but determines to set the P-SRS, the eNB sends a P-SRS enable message (i.e., a periodic enable message instructing P-SRS enable for the secondary serving cell additionally configured by the UE) to the UE at step S530.

The P-SRS enable message may be transmitted through a DL CC connected to a relevant UL CC through establishment configuration. Furthermore, a CIF (carrier index field) may be inserted irrespective of establishment configuration and then sent to a UE whose cross CC scheduling has been activated as one of DL CCs.

The P-SRS enable message may be transmitted through the PDCCH of an L1 layer, through the MAC CE of an L2 layer, or through the RRC message of an L3 layer. Here, the RRC message may be transmitted only through a DL primary serving cell. In this case, index information about a secondary serving cell to which the P-SRS enable message is applied may be included in the RRC message.

FIG. 6 illustrates the format of a P-SRS enable message according to an exemplary embodiment.

Referring to FIG. 6, A is the format of the P-SRS enable message defined in the L1 layer. According to this format, the P-SRS enable message may include flag information or field information, instructing P-SRS triggering, within a PDCCH including UL resource allocation (UL grant) and UL control information. In this case, the P-SRS configuration information is sent to a UE through an RRC message.

For example, 1 bit may be allocated to the flag information indicating P-SRS information. The UL resource allocation (UL grant) information and the UL control information refer to resource allocation information, used to send uplink data, and control information.

B shows an example of the format of the P-SRS enable message defined in the L2 layer. According to this format, the P-SRS enable message may include an LCID, indicating P-SRS information, in the MAC subheader and may include enable or disable information in the payload.

C shows another example of the format of the P-SRS enable message defined in the L2 layer. The P-SRS enable message may include activation or deactivation information about a secondary serving cell or an LCID, instructing the activation or deactivation of the secondary serving cell, in the MAC subheader and may include activation or deactivation configuration information (P-SRS band allocation information and transmission subframe allocation information) in the payload. The P-SRS enable message, including the activation or deactivation information of the secondary serving cell or the LCID and the activation or deactivation configuration information, may be transmitted.

The format of the P-SRS enable message defined in the L3 layer may further include an IE, indicating P-SRS enable or disable for each CC within an RRC message related to a UE-specific SRS parameter.

Referring back to FIG. 5, the eNB may perform a P-SRS configuration procedure before configuring the P-SRS. Accordingly, the eNB may instruct the UE to perform the P-SRS configuration procedure through an RRC message. The UE sets the P-SRS according to the P-SRS configuration procedure. Furthermore, the UE may release the P-SRS configuration procedure when a P-SRS release request is received through the MAC layer within the UE or a P-SRS release request message is received from the eNB through the RRC message.

The P-SRS configuration request message consists of pieces of UE-specific information. The information may include P-SRS band allocation information and transmission subframe allocation information.

Next, when the P-SRS enable information is received, the UE calculates the time when the P-SRS will be sent and sends the P-SRS on the determined time at step S540.

The calculating of the P-SRS transmission time is described below.

For example, a UE may obtain an SRS band, an SRS transmission cycle, and an SRS offset value from P-SRS configuration information received through system information.

If the earliest 'transmission-possible subframe' is outside the SRS offset range when the P-SRS enable information is received, the UE periodically sends the SRS only through bands and subframes, defined in the P-SRS configuration information, from the transmission-possible subframe. The SRS cycle may be set to 2 ms to 1024 ms.

If the earliest 'transmission-possible subframe' is within the SRS offset range if the P-SRS enable information is received, the UE periodically sends the SRS only through bands and subframes, defined in the P-SRS configuration information, from the earliest 'transmission-possible subframe' outside the offset range.

The P-SRS transmission time may be calculated based on the type or transmission layer of a P-SRS enable message.

As similarly shown in FIG. 3, for example, if the UE receives the P-SRS configuration information through a PDCCH, the UE may calculate the P-SRS transmission time on the basis of the time which has elapsed by 1 TTI (1 ms) from the time the P-SRS configuration information was received.

Furthermore, if the UE receives P-SRS configuration information through an MAC CE, the UE may calculate P-SRS transmission time on the basis of the time which has elapsed by 4 TTIs (4 ms) to 12 TTIs (12 ms) from the time when the P-SRS configuration information was received. The reference time may be changed and determined according to an HARQ operation.

Furthermore, if the UE receives P-SRS configuration information through an RRC, the UE may calculate P-SRS transmission time on the basis of the time which has elapsed by 15 TTIs (15 ms) or more from the time when the P-SRS configuration information was received. The reference time may be changed and determined according to an HARQ operation.

After the step S540, when the eNB receives the SRS during the P-SRS cycle set in the UE, the eNB obtains uplink channel information based on the received SRS. The eNB generates scheduling information about the additionally configured secondary serving cell based on the obtained channel information. The eNB sends the generated scheduling information to the UE at step S550.

Next, the UE sends data (or PUSCH) through the additionally configured secondary serving cell based on the received uplink scheduling information (UL grant information) at step S560.

Next, the eNB selects a secondary serving cell to be excluded from the uplink scheduling, from among the secondary serving cells of the UE. The secondary serving cell may be selected based on the SR information and the BSR information of the UE, and a loading factor, a bandwidth, the number of UEs, a coverage, and a power headroom report (PHR) of each serving cell now being operated within the eNB.

The eNB sends a P-SRS disable message for the selected secondary serving cell to the UE at step S570. Here, the P-SRS disable message may be transmitted in the same as or similar to the transmission scheme of the P-SRS enable message.

If the P-SRS disable message is received from the eNB, the UE stops the P-SRS transmission and sends an ACK message to the eNB in response to the P-SRS disable message, if needed, at step S580.

As an embodiment in which periodic SRS (P-SRS) is transmitted through an additionally configured secondary serving cell, a P-SRS setup/release message may be used instead of the P-SRS enable/disable message. In other words, if an eNB determines whether to set an A-SRS or a P-SRS and, as a result of the determination, determines to set the P-SRS without setting the A-SRS, the eNB sends a P-SRS setup message (i.e., a periodic transmission setup message instructing the setup of the P-SRS for a secondary serving cell additionally configured by a relevant UE). The P-SRS setup message is transmitted through the primary serving cell of the UE. Alternatively, the P-SRS setup message may be transmitted through a DL SCC connected to an UL SCC through establishment configuration. The P-SRS setup message is transmitted through the RRC message of the L3 layer.

For example, in the case of the P-SRS setup message defined in the L1 layer, flag information or field information, indicating P-SRS setup, may be included in a PDCCH including UL resource allocation (UL grant) and UL control information and then transmitted. In this case, the P-SRS configuration information may be transmitted to the UE through an RRC message. Thus, the P-SRS setup message may include flag information of 1 bit, indicating P-SRS configuration information, UL resource allocation information used to send uplink data, and control information.

Furthermore, in the case of the P-SRS setup message defined in the L2 layer, an LCID indicating P-SRS configuration information may be included in the MAC subheader, and setup/release information may be included in the payload. Next, the LCID and the setup/release information may then be transmitted.

If the P-SRS setup information is received, the UE calculates the time that a P-SRS will be transmitted and sends the P-SRS on the determined time. For example, the UE may obtain an SRS band, an SRS transmission cycle, and an SRS offset value based on the P-SRS configuration information received through system information. If the earliest 'transmission-possible subframe' is outside the SRS offset range when the P-SRS setup information is received, the UE periodically sends the SRS only through bands and subframes, defined in the P-SRS configuration information, from the transmission-possible subframe. The SRS cycle may be set to 2 ms to 1024 ms. If the earliest 'transmission-possible subframe' is within the SRS offset range when the P-SRS setup information is received, the UE periodically sends the SRS only through bands and subframes, defined in the P-SRS configuration information, from the earliest 'transmission-possible subframe' outside the offset range. Meanwhile, the P-SRS transmission time may be calculated based on the type or transmission layer of a P-SRS setup message. As in FIG. 3, for example, when the UE receives the P-SRS configuration information through an RRC, the UE may calculate the P-SRS transmission time on the basis of the time which has elapsed by 15 TTIs (15 ms) or more from the time when the P-SRS configuration information was received.

Next, if the reception of the SRS is completed during the set P-SRS cycle, the eNB obtains uplink channel information based on the received SRS, generates scheduling information for the additionally configured secondary serving cell based on the obtained channel information, and sends the generated scheduling information to the UE. The UE sends data through the additionally configured secondary serving cell based on the received uplink scheduling information (UL grant information).

Next, if the eNB checks a secondary serving cell to be excluded from the uplink scheduling, from among the secondary serving cells of the UE, the eNB may select the checked secondary serving cell and send the P-SRS release message. Here, the P-SRS release message may be transmitted in the same manner as or similar to the transmission scheme of the P-SRS setup message. If the P-SRS release message is received from the eNB, the UE stops the P-SRS transmission and sends an ACK message to the eNB in response to the release message, if needed.

Figure 7:
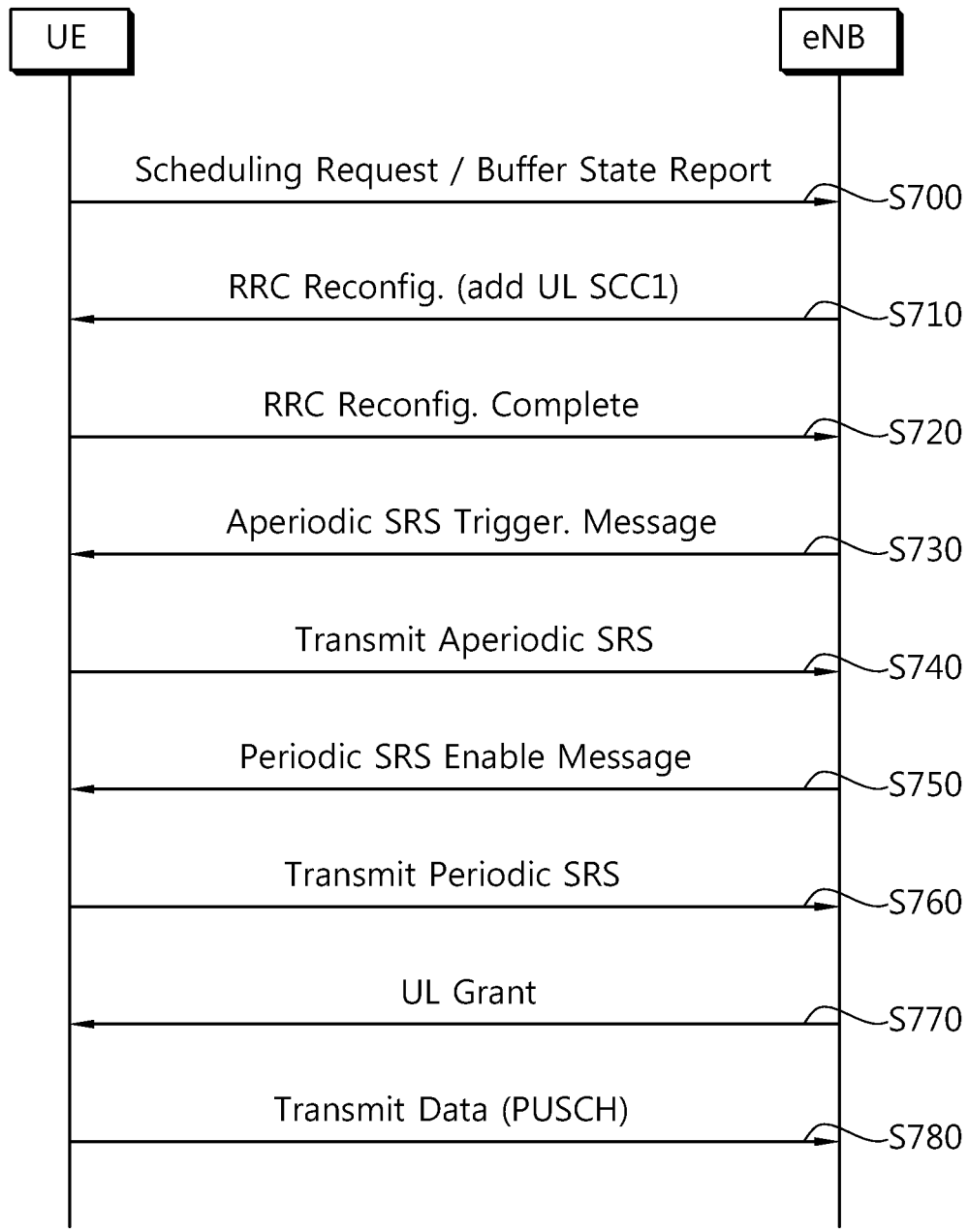
FIG. 7 shows the flow of a signal according to an exemplary embodiment.

FIG. 7 shows the flow of a signal according to an exemplary embodiment.

Referring to FIG. 7, an example in which P-SRS transmission may be additionally performed may include a case where an eNB has set an A-SRS for an additionally configured secondary serving cell for fast scheduling based on SR information or BSR information or both, and determines to perform consistent scheduling by continuously receiving the SR information or the BSR information or both and thus additionally sets a P-SRS.

Steps S700 to S740 are similar to the steps S300 to S340 of FIG. 3, respectively. More detail, the UE sends at least one of a scheduling request (SR) for uplink resource allocation, a BSR for data, and information on handover to the eNB. The UE receives and checks reconfiguration information of one or more SCells sent from the eNB, and the UE reconfigures the at least one SCell based on the reconfiguration information. The UE receives an A-SRS triggering message including an activation or deactivation of the one more SCells. The UE may receive A-SRS configuration information including A-SRS band allocation information and transmission subframe allocation information for the A-SRS transmission via RRC message in S710 before the receiving the A-SRS triggering message. So the UE can transmit A-SRS via an activated SCell from among the at least one reconfigured SCell.

The UE may also receives a P-SRS enable message from the eNB, herein, the UE may receive P-SRS configuration information including P-SRS band allocation information and transmission subframe allocation information for the P-SRS transmission via RRC message in S710. And then, the UE transmits P-SRS through an activated SCell from among the at least one reconfigured SCell. The activated SCell for A-SRS transmission and the activated SCell for P-SRS transmission may be the same or different.

The UE can receive the A-SRS triggering message or the P-SRS enable message, via a PCell. Additionally, the UE may receive indication of the A-SRS transmission, A-SRS configuration information, and information about an A-SRS transmission time through the PCell. The UE may calculate a transmission subframe for the A-SRS transmission using an automatic repeat request (ARQ), and transmit A-SRS in the calculated transmission subframe while the UE transmits P-SRS in determined transmission subframe.

If an additional P-SRS is determined to be needed while A-SRS transmission is performed at step S740, the eNB generates a P-SRS enable message, similarly described with reference to FIG. 5, and sends the P-SRS enable message to an UE at step S750.

A format, a transmission scheme, etc. of the P-SRS enable message may be similar to those described in FIG. 5.

Next, if P-SRS enable information is received, the UE calculates the time when the P-SRS will be transmitted and sends the P-SRS on the determined time at step S760. The P-SRS transmission time may be calculated in a similar manner as the embodiment of FIG. 5.

Next, if the eNB completes the reception of an A-SRS and the additional P-SRS, the eNB obtains uplink channel information based on the received A-SRS and P-SRS. The eNB generates scheduling information for the additionally configured secondary serving cell based on the obtained channel information. The eNB sends the generated scheduling information to the UE using an UL grant message or the like at step S770.

At step S780, the UE sends data through the additionally configured secondary serving cell based on the received uplink scheduling information (UL grant information) at step S780.

Figure 8:
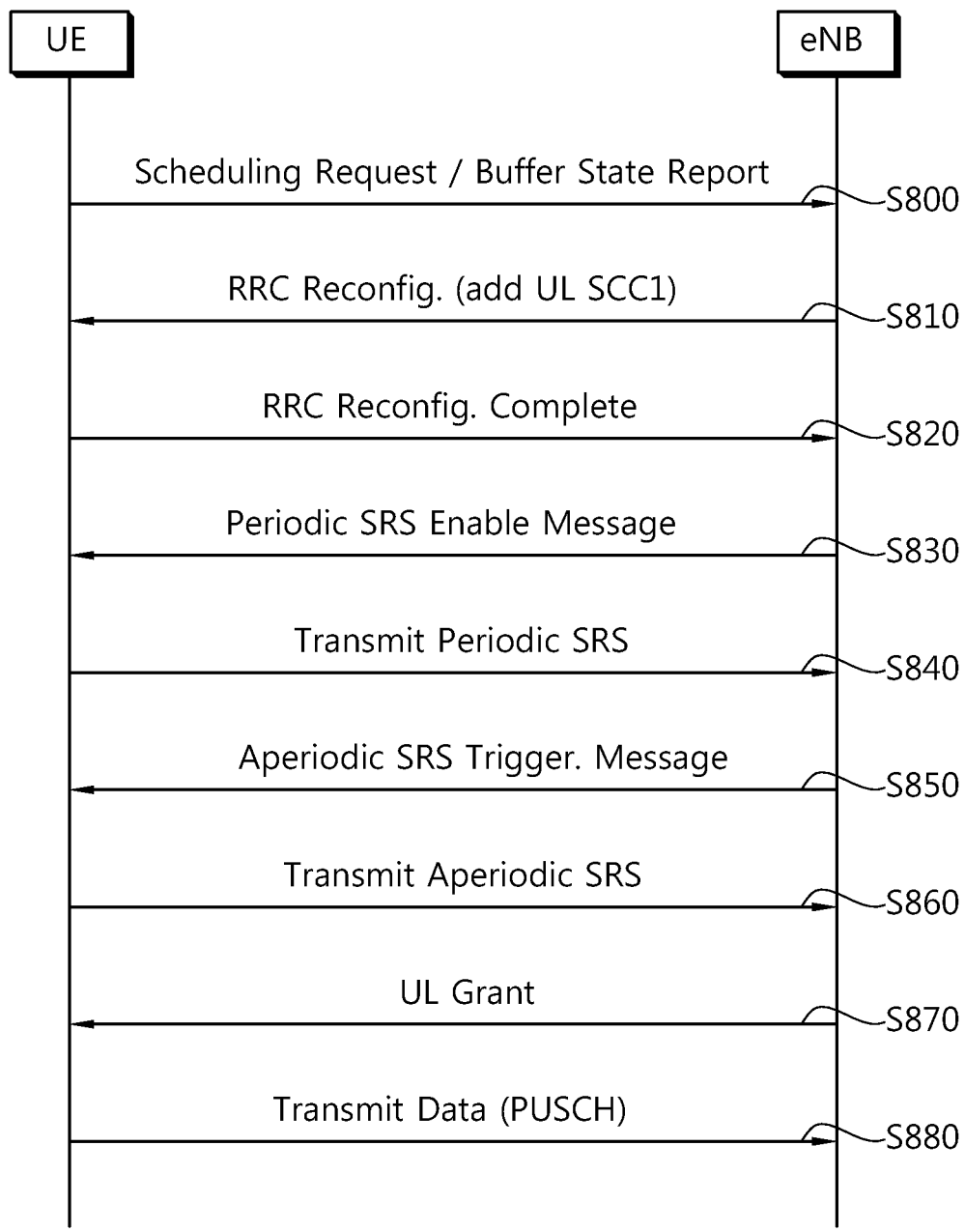
FIG. 8 shows the flow of a signal according to an exemplary embodiment.

FIG. 8 shows the flow of a signal according to an exemplary embodiment.

Referring to FIG. 8, an example in which A-SRS transmission may be additionally performed may include a case where an eNB has determined that the A-SRS transmission is not to be performed for an additionally configured secondary serving cell based on SR information or BSR information or both and thus has set only a P-SRS, but subsequently determines that the A-SRS is to be additionally set for faster and more accurate scheduling because it is to receive burst data sensitive to latency by receiving an SR or BSR information or both in uplink, but not limited thereto.

The example shown in FIG. 8 may also be applied to a case where the update of system information is performed owing to a change in the cell-specific parameters of a P-SRS, but an A-SRS needs to be additionally set during the period of the system information update for accurate scheduling because an SRS cannot be transmitted during the period.

Steps S800 to S840 are similar to the steps S500 to S540 respectively.

Specifically, an eNB receives an SR or a BSR or both from an UE at step S800. If the eNB determines that an additional secondary serving cell is to be configured, the eNB sends an additional secondary serving cell setup message (RRC reconfiguration) to the UE at step S810 so that the configuration of the additional secondary serving cell is completed at step S820.

Next, if the eNB determines whether to set an A-SRS or a P-SRS and, as a result of the determination, determines to set the P-SRS without setting the A-SRS, the eNB sends a P-SRS enable message (i.e., a periodic enable message indicating P-SRS enable for the secondary serving cell additionally configured by the UE) to the UE at step S830. If the P-SRS enable information is received, the UE calculates the time the P-SRS will be transmitted and sends the P-SRS to the determined time at step S840.

If an additional A-SRS needs to be set while the P-SRS transmission is performed at step S840, the eNB generates an A-SRS triggering message, such as that described with reference to FIG. 3, and sends the generated A-SRS triggering message to the UE at step S850.

A format, a transmission scheme, etc. of the A-SRS triggering message may be the same as those according to the embodiment of FIG. 3.

If the A-SRS triggering message is received, the UE calculates the time that the A-SRS will be transmitted and sends the A-SRS on the determined time at step S860. The A-SRS transmission time may be calculated in the same manner as the embodiment of FIG. 3.

If the reception of the P-SRS and the additional A-SRS is completed, the eNB obtains uplink channel information based on the received A-SRS and P-SRS. The eNB generates scheduling information for the additionally configured secondary serving cell based on the obtained channel information. If the eNB sends the generated scheduling information to the UE using an UL grant message at step S870, the UE sends data through the additionally configured secondary serving cell based on the received uplink scheduling information (UL grant information) at step S880.

Figure 9:
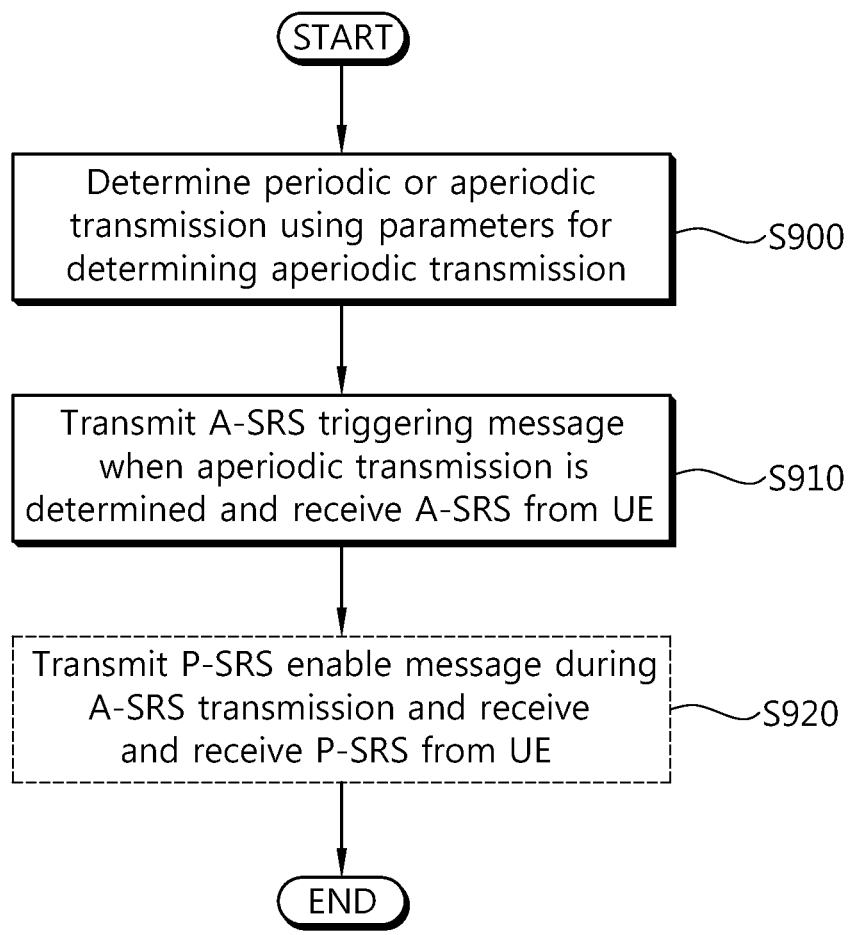
FIG. 9 is a flowchart illustrating a process of an eNB performing A-SRS transmission or P-SRS transmission or both according to an exemplary embodiment.

FIG. 9 is a flowchart illustrating a process according to an exemplary embodiment.

Referring to FIG. 9, the eNB determines whether to aperiodically transmit an SRS by using A-SRS transmission parameters (e.g., an SR, a BSR, and whether to perform handover) for determining whether to send the SRS for an additional secondary serving cell periodically or aperiodically at step S900. If the aperiodic transmission (A-SRS) is determined, the eNB generates an A-SRS triggering message for the aperiodic transmission, sends the generated A-SRS triggering message to a UE, and aperiodically receives the SRS for the secondary serving cell at step S910.

Furthermore, if the eNB determines to perform periodic SRS transmission during an A-SRS transmission process, such as the step S910 (e.g., a case shown in FIG. 7), the eNB may generate a periodic transmission (P-SRS) enable message for the periodic transmission and send the generated periodic enable message to the UE, or alternatively, may generate a periodic transmission (P-SRS) setup message, send the generated periodic transmission setup message to the UE, and periodically receive the SRS for the secondary serving cell from the UE at step S920.

Furthermore, a step may be included of the eNB determining whether to configure the additional secondary serving cell by further taking SR information and BSR information received from the UE, a loading factor for each serving cell now being operated in the eNB, the bandwidth of each serving cell, the number of UEs within a relevant serving cell, the coverage of each serving cell, and a power headroom report (PHR) into consideration and, if, as a result of the determination, the additional secondary serving cell is to be configured, informing the UE of the fact using an RRC reconfiguration message, and allowing the UE to reconfigure the additional secondary serving cell.

The same technology described above with reference to FIGS. 3 to 6 may be applied to the formats of the A-SRS triggering message and the P-SRS enable message or the periodic transmission (P-SRS) setup message, the transmission scheme, the calculation of the SRS transmission time, and so on.

Figure 10:
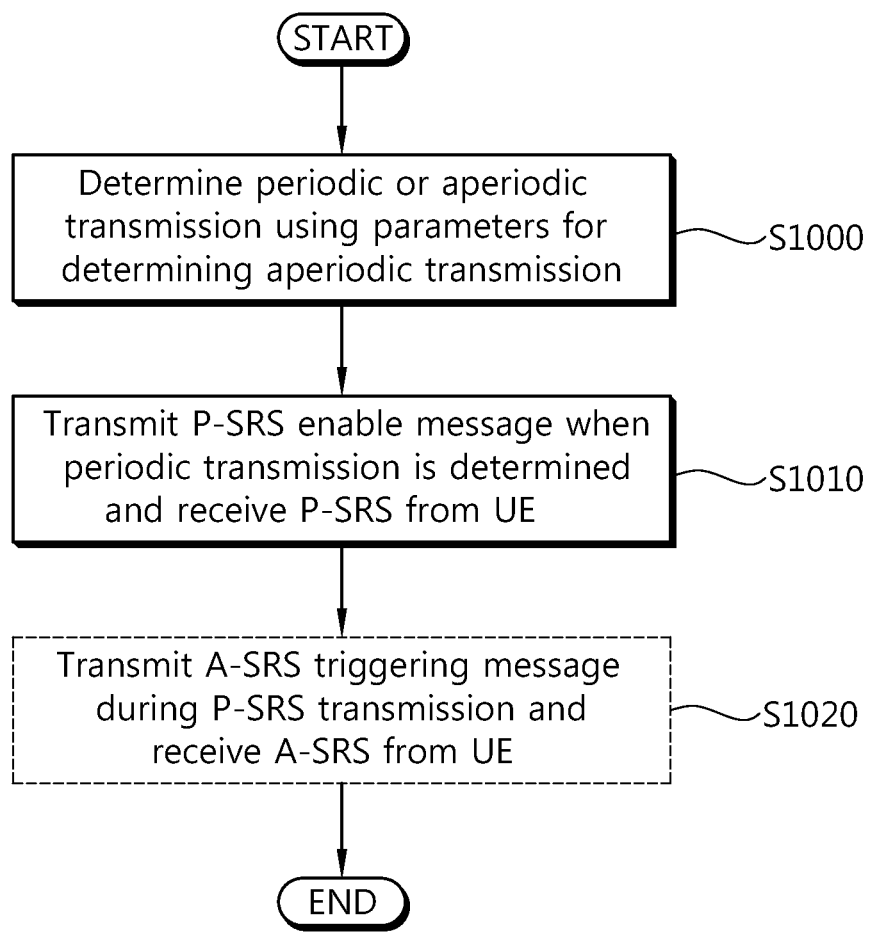
FIG. 10 is a flowchart illustrating a process of an eNB performing A-SRS transmission or P-SRS transmission or both according to an exemplary embodiment.

FIG. 10 is a flowchart illustrating a process according to an exemplary embodiment.

The process of FIG. 10 corresponds to a case where A-SRS transmission is first additionally set during P-SRS transmission.

Referring to FIG. 10, the eNB determines whether to aperiodically transmit an SRS using A-SRS transmission parameters (e.g., an SR, a BSR, and whether to perform handover) for determining whether to send the SRS for an additional secondary serving cell periodically or aperiodically at step S1000. If the periodic transmission (P-SRS) is determined, the eNB generates a P-SRS enable message or a periodic transmission (P-SRS) setup message for the periodic transmission, sends the generated message to a UE, and receives a P-SRS for the secondary serving cell at step S1010.

Furthermore, if the eNB determines that SRS transmission is to be performed during a P-SRS transmission process, such as the step S1010 (e.g., a case shown in FIG. 8), the eNB may generate an aperiodic transmission (A-SRS) triggering message for the aperiodic transmission, send the generated aperiodic triggering message to the UE, and receive the A-SRS for the secondary serving cell from the UE at step S1020.

Furthermore, a step may be included of the eNB determining whether to configure the additional secondary serving cell by further taking SR information and BSR information received from the UE, a loading factor for each serving cell now being operated in the eNB, the bandwidth of each serving cell, the number of UEs within a relevant serving cell, the coverage of each serving cell, and a power headroom report (PHR) into consideration and, if, as a result of the determination, the additional secondary serving cell needs to be configured, informing the UE of the fact using an RRC reconfiguration message, and allowing the UE to reconfigure the additional secondary serving cell.

The same technology described above with reference to FIGS. 3 to 6 may be applied to the formats of the A-SRS triggering message and the P-SRS enable message and the transmission scheme, the calculation of the SRS transmission time, and so on.

Figure 11:
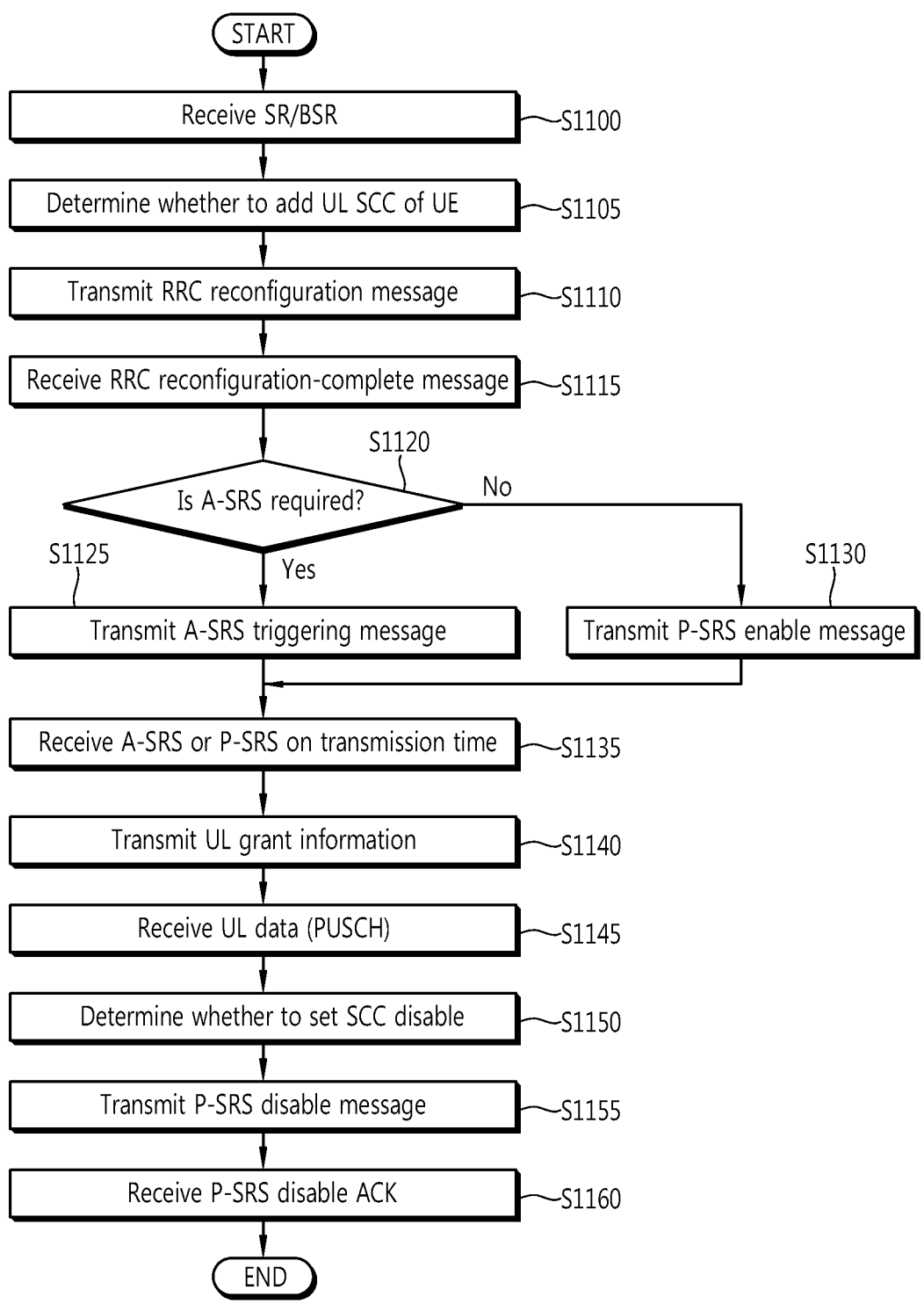
FIG. 11 is a flowchart illustrating a process of an eNB performing A-SRS transmission or P-SRS transmission or both according to an exemplary embodiment.

FIG. 11 is a flowchart illustrating a detailed process according to an exemplary embodiment.

Referring to FIG. 11, the eNB receives an SR or a BSR from a UE at step S1100 and determines whether to add a secondary serving cell for the UE by taking various pieces of information for each serving cell now being operated in the eNB (e.g., the loading factor, the bandwidth, the number of UEs within the eNB, the coverage, and power headroom) into account at step S1105.

If, as a result of the determination, the secondary serving cell is to be added, the eNB generates an RRC reconfiguration message including information about the secondary serving cell to be additionally configured, sends the generated RRC reconfiguration message to the U at step S1110, and receives an RRC reconfiguration-complete message (i.e., a reconfiguration-complete message for the additional secondary serving cell) from the UE at step S1115.

Next, the eNB determines whether to perform A-SRS transmission based on A-SRS transmission parameters for determining the aperiodic transmission, such as an SR, a BSR, and whether to perform handover, at step S1120. If, as a result of the determination, the A-SRS transmission is determined to be performed, the eNB generates an A-SRS triggering message including the A-SRS configuration information and sends the generated A-SRS triggering message to the UE at step S1125.

If, as a result of the determination at step S1120, P-SRS transmission is to be performed, the eNB generates a P-SRS enable message or a periodic transmission (P-SRS) setup message and sends the message to the UE at step S1130. The message instructing the transmission of the A-SRS or the P-SRS is similar to the transmissions described with reference to FIGS. 4 and 6.

Next, the eNB receives the A-SRS or the P-SRS from the UE on a calculated transmission time at step S1135, generates scheduling information (UL grant information) for the additionally configured secondary serving cell based on uplink channel information obtained based on the periodically or aperiodically received SRS, sends the generated scheduling information to the UE at step S1140, and receives data from the UE through the additionally configured secondary serving cell at step S1145.

The eNB selects a secondary serving cell to be excluded from the uplink scheduling, from among the secondary serving cells of the UE, based on SR information or BSR information or both received from the UE and the loading factor of each serving cell now being operated within the eNB, the bandwidth, the number of UEs, the coverage, and a power headroom report (PHR) at step S1150, sends a P-SRS disable message or a release message for the selected secondary serving cell to the UE at step S1155, and receives an ACK message for the P-SRS disable message or the release message from the UE at step S1160.

If an additional P-SRS or A-SRS needs to be received in the process of the eNB receiving the A-SRS or the P-SRS in FIG. 11, the eNB may generate a P-SRS enable message or an A-SRS triggering message for setting the additional P-SRS or A-SRS, send the generated message to the UE, and receive an additional P-SRS signal or A-SRS signal from the UE in response to the message.

In FIG. 11, the A-SRS configuration information, the formats of the A-SRS triggering message and the P-SRS enable message, the transmission scheme, the calculation of the SRS transmission time, and so on may be similar to those described with reference to FIGS. 3 to 6.

The process performed by the UE for the A-SRS transmission or the P-SRS transmission or both may further include sending A-SRS transmission parameters for determining whether to periodically or aperiodically send the SRS for the additionally configured secondary serving cell to the eNB, receiving reconfiguration information about the additional secondary serving cell, reconfiguring the additional secondary serving cell, receiving an aperiodic triggering message for the aperiodic transmission from the eNB, and then aperiodically sending the SRS for the additional secondary serving cell to the eNB. Furthermore, during the A-SRS transmission, a periodic enable message for the periodic transmission may be further received from the eNB, and the SRS for the secondary serving cell may be periodically sent to the eNB.

Unlike the above, the UE may send A-SRS transmission parameters for determining whether to periodically or aperiodically send the SRS for an additionally configured secondary serving cell (secondary component carrier) to the eNB, receiving reconfiguration information about the additional secondary serving cell, reconfiguring the additional secondary serving cell, receiving an periodic triggering message for the periodic transmission from the eNB, and then periodically sending the SRS for the additional secondary serving cell to the eNB. Furthermore, during the P-SRS transmission, an aperiodic enable message for the aperiodic transmission may be further received from the eNB, and the SRS for the secondary serving cell may be aperiodically sent to the eNB.

Figure 12:
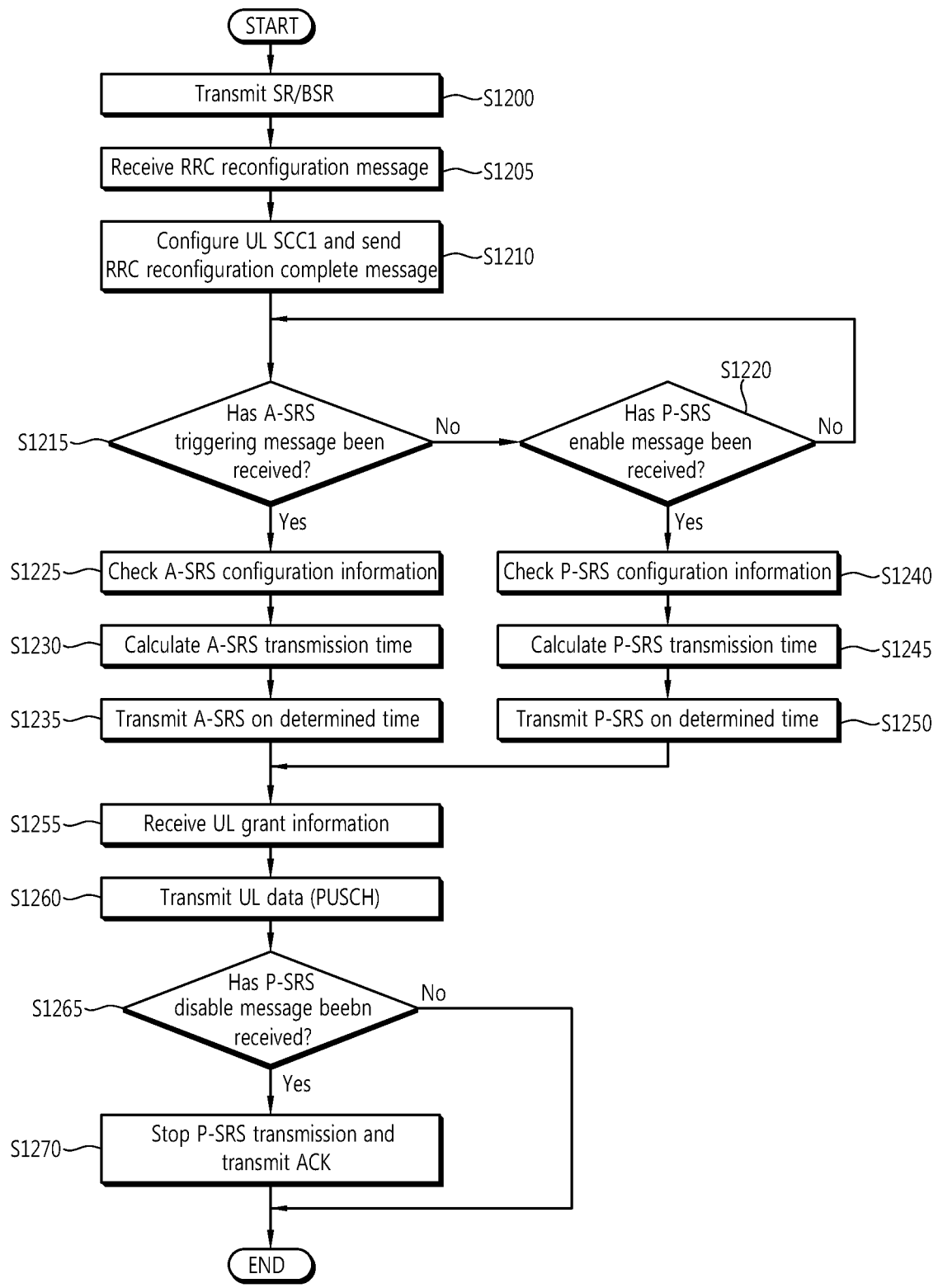
FIG. 12 is a flowchart illustrating a process of a UE performing A-SRS transmission or P-SRS transmission or both according to an exemplary embodiment.

FIG. 12 is a flowchart illustrating a detailed process according to an exemplary embodiment.

Referring to FIG. 12, if the UE detects that there is data to be transmitted in an uplink, the UE sends an SR to an eNB in order to request UL resource allocation from the eNB and may send a BSR, indicating the amount of data to be transmitted, to the eNB at step S1200.

The UE receives an RRC reconfiguration message, transmitted for the allocation of an additional secondary serving cell to the UE, from the eNB and checks the secondary serving cell to be added at step S1205.

The UE performs a configuration procedure for the uplink secondary serving cell to be added. After the configuration procedure for the uplink secondary serving cell is completed, the UE sends an RRC reconfiguration-complete message to the eNB at step S1210.

Next, the UE determines whether an A-SRS triggering message is received from the eNB at step S1215 and whether a P-SRS enable message is received from the eNB at step S1220. If, as a result of the determination, the A-SRS triggering message is determined to be received, the UE checks pieces of A-SRS configuration information (e.g., A-SRS band allocation information and the transmission subframe allocation information) included in the A-SRS triggering message at step S1225.

The UE calculates the time that the A-SRS may be transmitted in based on the received A-SRS configuration information before the A-SRS triggering message is received or at the same time that the A-SRS triggering message is received. Alternatively, if information about the A-SRS transmission start time is received from the eNB, the UE determines the time that the A-SRS will be transmitted at step S1230 and aperiodically sends the SRS (A-SRS transmission) on the determined time at step S1235.

If, as a result of the determination, the P-SRS enable message is determined to be received at step S1220, the UE checks pieces of P-SRS configuration information (e.g., P-SRS band allocation information and transmission subframe allocation information) included in the P-SRS enable message at step S1240.

The UE calculates the time when the P-SRS will be transmitted using the P-SRS enable message at step S1245 and periodically sends the SRS (P-SRS transmission) of the determined time at step S1250.

The eNB generates scheduling information (UL grant information) for the additionally configured secondary serving cell based on uplink channel information obtained from the periodically or aperiodically received SRS and sends the generated scheduling information. Next, the UE receives the scheduling information at step S1255 and sends data through the additionally configured secondary serving cell at step S1260.

Next, the UE determines whether a P-SRS disable message (i.e., a disable message for a secondary serving cell to be excluded from the uplink scheduling, from among the secondary serving cells of the UE) or release is received from the eNB at step S1265. If, as a result of the determination, the P-SRS disable message or release is determined to have been received, the UE stops the P-SRS transmission for the secondary serving cell or releases resource configuration of P-SRS and sends an ACK message to the eNB in response thereto at step S1270.

Although not shown, if a P-SRS enable message or an A-SRS triggering message for additional P-SRS or A-SRS setup is received from the eNB in the process of the UE sending the A-SRS or the P-SRS in FIG. 12, the UE may further send an additional P-SRS signal or an additional A-SRS signal based on the P-SRS configuration information or the A-SRS configuration information included in a relevant message.

In FIG. 12, the A-SRS configuration information, the P-SRS configuration information, the formats of the A-SRS triggering message and the P-SRS enable message, the transmission scheme, the cycle, or the calculation of the aperiodic SRS transmission time may be the same as those described with reference to FIGS. 3 to 6.

Figure 13:
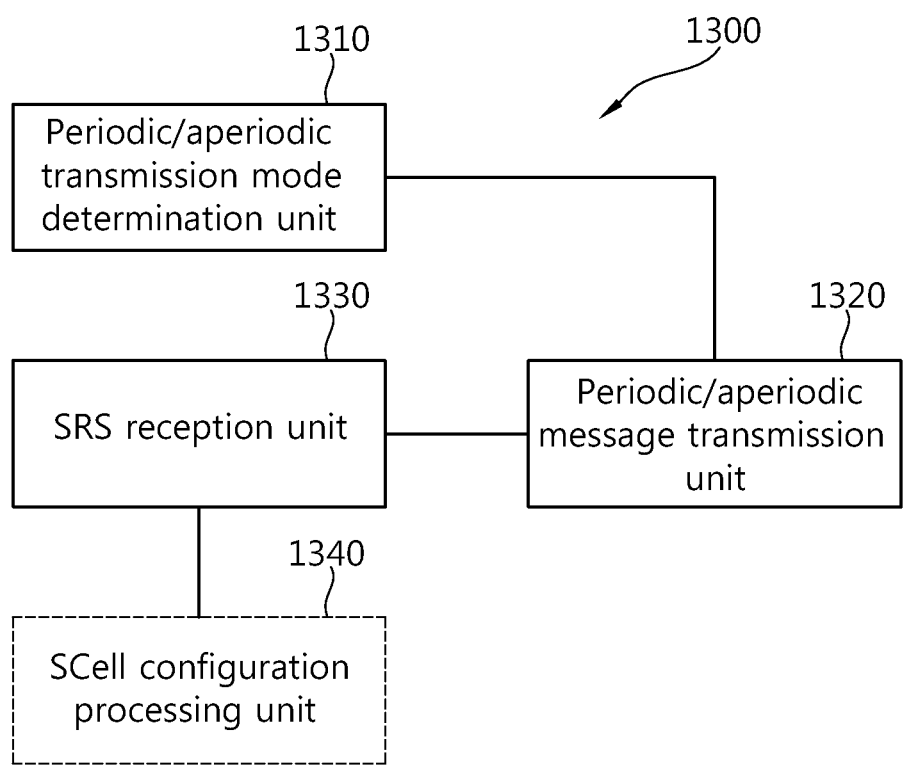
FIG. 13 is a block diagram of an eNB for each function according to an exemplary embodiment.

FIG. 13 is a block diagram according to an exemplary embodiment.

Referring to FIG. 13, the eNB 1300 refers to an apparatus for receiving an SRS for a secondary serving cell (or SCC) from a UE in a communication system using multiple CCs, but not limited thereto.

The eNB 1300 may include a periodic/aperiodic transmission mode determination unit 1310, a periodic/aperiodic message transmission unit 1320, and an SRS reception unit 1330. The periodic/aperiodic transmission mode determination unit 1310 determines whether to perform A-SRS transmission or P-SRS transmission for an additional secondary serving cell (or SCC) configured in a specific UE, using parameters for determining the A-SRS transmission and determines whether to change the additional secondary serving cell to an activation state. If the A-SRS transmission is determined by the transmission mode determination unit 1310, the periodic/aperiodic message transmission unit 1320 generates an A-SRS triggering message including the A-SRS configuration information and sends the generated A-SRS triggering message to a UE. If the P-SRS transmission is determined by the transmission mode determination unit 1310, the periodic/aperiodic message transmission unit 1320 generates a P-SRS enable message including the P-SRS configuration information and sends the generated P-SRS enable message to the UE.

Each of the A-SRS triggering message and the P-SRS enable messages includes an activation or deactivation of the a SCell. The A-SRS triggering message comprises an LCID and a bit. The LCID indicates the activation or deactivation of a SCell configured in a UE. The bit indicates the activation or deactivation of a relevant SCell and corresponding to a cell index. Or the A-SRS triggering message comprises A-SRS configuration information which includes at least one of band allocation information and transmission subframe allocation information for the A-SRS transmission, and index information about an SCell in which the A-SRS configuration information is transmitted.

The periodic/aperiodic message transmission unit 1320 generates an RRC message including either band allocation information and transmission subframe allocation information for the A-SRS transmission or band allocation information and transmission subframe allocation information for the P-SRS transmission and transmits the RRC message to a UE.

The SRS reception unit 1330 aperiodically or periodically receives the SRS through an activated SCell based on the A-SRS configuration information or the P-SRS configuration information.

The parameters for determining the A-SRS transmission correspond to information received from the UE and may be at least one of an SR, a BSR, and information on whether to perform handover, but not limited thereto.

The eNB 1300 may further include a secondary serving cell (or SCC) configuration processing unit 1340 for determining whether to add an secondary serving cell for a UE based on an SR, a BSR, and pieces of information about each serving cell now being operated (e.g., the loading factor, the bandwidth, the number of UEs, the coverage, and power headroom), generating an additional secondary serving cell configuration message, and sending the generated additional secondary serving cell configuration message to the UE.

The eNB 1300 may further include an additional SRS reception unit for, if an A-SRS or a P-SRS (i.e., different transmission schemes) are determined to be needed while receiving the P-SRS or the A-SRS, generating an A-SRS triggering message indicating the A-SRS transmission or a P-SRS enable message indicating the P-SRS transmission, transmitting the generating message to a UE, and aperiodically or periodically receiving an additional SRS from the UE.

The A-SRS configuration information, the P-SRS configuration information, the formats of the A-SRS triggering message and the P-SRS enable message, the transmission scheme, the cycle, the calculation of an aperiodic SRS transmission time, etc. which are applied to the eNB 1300 may be the same as those described with reference to FIGS. 3 to 6, and a detailed description thereof is omitted in order to avoid redundancy.

Figure 14:
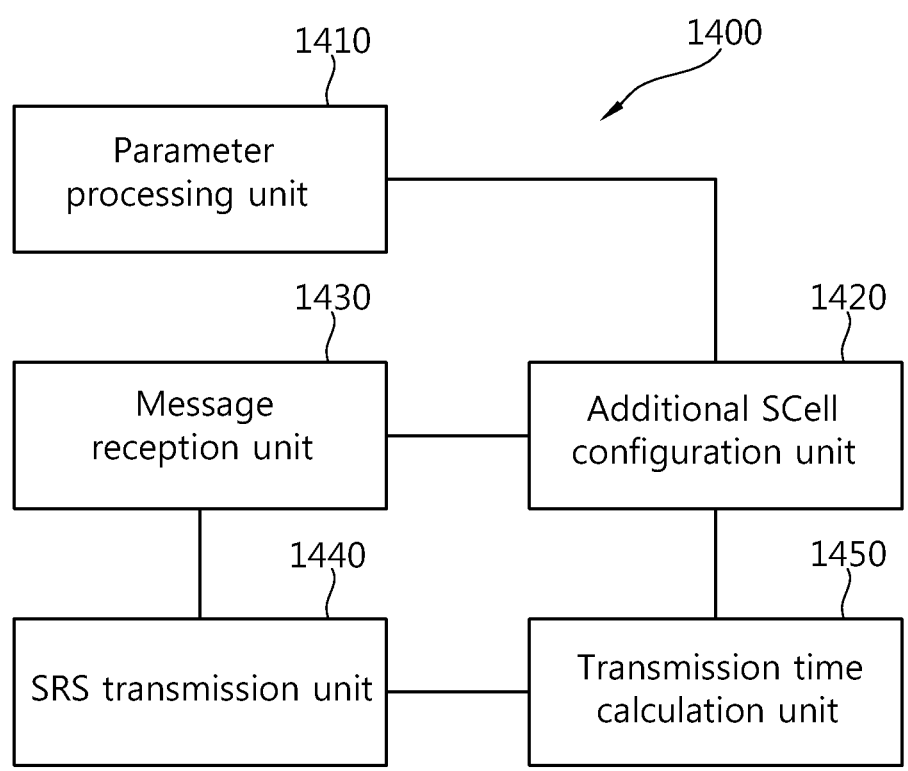
FIG. 14 is a block diagram of a UE for each function according to an exemplary embodiment.

FIG. 14 is a block diagram according to an exemplary embodiment.

Referring to FIG. 14, the UE 1400 according to the embodiment of the present invention refers to an apparatus for generating an SRS for a secondary serving cell (or SCC) in a communication system using multiple CCs and periodically or aperiodically transmitting the generated SRS to an eNB, but not limited thereto.

The UE 1400 may include a parameter processing unit 1410, an additional secondary serving cell (or SCC) configuration unit 1420, a message reception unit 1430, and an SRS transmission unit 1440. The parameter processing unit 1410 generates parameters for determining A-SRS transmission and determining the periodic or aperiodic transmission of an SRS for a secondary serving cell and transmits the generated parameters to an eNB. The additional secondary serving cell configuration unit 1420 receives reconfiguration information about the secondary serving cell, reconfigures the secondary serving cell based on the reconfiguration information, and changes a state of the reconfigured secondary serving cell to an activation state or a deactivation state when the message reception unit 1430 receives an A-SRS triggering message for the A-SRS transmission or a P-SRS enable message for P-SRS transmission or both. The message reception unit 1430 receives one or more of the A-SRS triggering message for the A-SRS transmission and the P-SRS enable message for the P-SRS transmission from the eNB. If the A-SRS triggering message is received, the SRS transmission unit 1440 activates the secondary serving cell and aperiodically transmits the SRS for the secondary serving cell to the eNB. If the P-SRS enable message is received, the SRS transmission unit 1440 activates the secondary serving cell and periodically transmits the SRS for the secondary serving cell to the eNB.

The UE 1400 may further include a transmission time calculation unit 1450 for calculating the time that the SRS will be transmitted using the received A-SRS triggering message or the received P-SRS enable message. The SRS transmission unit 1440 aperiodically or periodically transmits the SRS to the eNB on an A-SRS transmission time and a P-SRS transmission time calculated by the transmission time calculation unit 1450.

The A-SRS triggering message and the P-SRS enable message may be transmitted through one of the layers L1 to L3.

The A-SRS triggering message includes aperiodic SRS (A-SRS) configuration information, and the A-SRS configuration information may include one or more of pieces of A-SRS band allocation information and transmission subframe allocation information.

The parameters for determining A-SRS transmission refer to information received from a UE, and they may be at least one of an SR, a BSR, and information on whether to perform handover, but not limited thereto. The A-SRS configuration information, the P-SRS configuration information, the formats of the A-SRS triggering message and the P-SRS enable message, the transmission scheme, the cycle, and the calculation of aperiodic SRS transmission time which are used in the UE may be the same as those described with reference to FIGS. 3 to 6.

According to the present embodiment, an SRS for a secondary serving cell (or SCC) is aperiodically or periodically transmitted in a communication environment using multiple CCs. Accordingly, there are advantages that may be achieved in that the efficiency of SRS transmission can be improved and the scheduling flexibility of the SRS can be increased.

In particular, uplink scheduling for an additional secondary serving cell and data communication through the uplink scheduling can be performed rapidly, as compared with a scheme using only a periodic SRS. Furthermore, there is an advantage in that uplink data can be transmitted according to the amount of data to be transmitted in uplink or a communication environment.

Although all the elements constituting an embodiment of the present invention are illustrated to be combined into one or to be combined and operated, the present invention is not necessarily limited to the embodiment. That is, one or more of all the elements may be selectively combined and operated within the range of the present invention.

Furthermore, each of all the elements may be implemented using independent hardware, but may be implemented as a computer program having a program module for performing some of or all functions combined in one or more pieces of hardware in which some of or all the elements are selectively combined. Codes and code segments constituting the computer program may be readily induced by a person having ordinary skill in the art to which the present invention pertains. The computer program may be stored in computer-readable media and read and executed by a computer, thereby being capable of implementing the embodiments of the present invention. The storage media of the computer program may include magnetic recording media, optical recording media, carrier wave media, and so on.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of receiving a sounding reference signal (SRS) in a wireless communication system supporting multiple component carriers by a base station, the method comprising:
configuring at least one secondary serving cell (SCell) for a user equipment (UE), the secondary serving cell corresponding to a secondary component carrier;
generating a message that indicates activation or deactivation of the at least one secondary serving cell, the at least one secondary serving cell comprising a secondary serving cell for transmitting an SRS from the UE to the base station;
transmitting the message to the UE; and
receiving an aperiodic SRS (A-SRS) from the UE through an activated one from among the at least one secondary serving cell configured in the UE if the message indicates the activation, the activated one being an activated secondary serving cell for transmitting the A-SRS from the UE to the base station.

2. The method of claim 1, further comprising:
receiving at least one of a scheduling request, a buffer state report (BSR), and information on handover from the UE; and
determining aperiodic SRS (A-SRS) transmission based on the at least one of a scheduling request, a buffer state report (BSR), and information on handover.

3. The method of claim 1, wherein the message comprises:
a logical channel identification (LCID) indicating the activation or deactivation of the at least one secondary serving cell configured in the UE, and
a bit indicating activation or deactivation of a relevant secondary serving cell and corresponding to a cell index.

4. The method of claim 1, wherein:
the message comprises A-SRS configuration information,
the A-SRS configuration information comprises at least one of A-SRS band allocation information and transmission subframe allocation information, and
the message further comprises index information about a secondary serving cell in which the message is transmitted.

5. The method of claim 1, further comprising:
transmitting a radio resource control (RRC) message including either band allocation information and transmission subframe allocation information for A-SRS transmission or band allocation information and transmission subframe allocation information for periodic SRS (P-SRS) transmission.

6. The method of claim 1, further comprising:
a message that indicates periodic SRS (P-SRS) transmission through a primary serving cell (PCell) if the P-SRS transmission is determined.

7. A method of transmitting an aperiodic sounding reference signal (A-SRS) in a wireless communication system supporting multiple component carriers performed by a user equipment (UE), the method comprising:
receiving, from a base station, reconfiguration information about a secondary serving cell (SCell) corresponding to a secondary component carrier;
reconfiguring the secondary serving cell based on the reconfiguration information;
receiving a message that indicates activation or deactivation of the secondary serving cell from the base station;
if the message indicates the activation, activating the secondary serving cell, the activated secondary serving cell comprising a secondary serving cell for transmitting an SRS from the UE to the base station, and enabling A-SRS transmission in the activated secondary serving cell for transmitting an SRS from the UE to the base station; and
transmitting an A-SRS from the UE to the base station through the activated secondary serving cell for transmitting an SRS from the UE to the base station.

8. The method of claim 7, wherein the message comprises:
a logical channel identification (LCID) indicating the activation or deactivation of the secondary serving cell configured in the user equipment, and
a bit indicating activation or deactivation of a relevant secondary serving cell and corresponding to a cell index.

9. The method of claim 7, wherein:
the message comprises A-SRS configuration information,
the A-SRS configuration information comprises at least one of A-SRS band allocation information and transmission subframe allocation information, and
the message further comprises index information about a secondary serving cell in which the message is transmitted.

10. The method of claim 7, further comprising:
receiving a radio resource control (RRC) message including either band allocation information and transmission subframe allocation information for the A-SRS transmission or band allocation information and transmission subframe allocation information for periodic SRS (P-SRS) transmission.

11. The method of claim 10, further comprising:
receiving identification (ID) information indicating the A-SRS transmission, A-SRS configuration information, and information about an A-SRS transmission time through a primary serving cell (PCell);
calculating a transmission subframe for the A-SRS transmission by taking an automatic repeat request (ARQ) into account; and
transmitting the A-SRS in the calculated transmission subframe.

12. The method of claim 7, further comprising:
receiving a message for periodic SRS (P-SRS) transmission through a primary serving cell (PCell).

13. A base station to receive a sounding reference signal (SRS) in a wireless communication system supporting multiple component carriers, the base station comprising:
a transmission mode determination unit configured to determine activation or deactivation of at least one secondary serving cell (SCell) configured in a user equipment, the secondary serving cell corresponding to a secondary component carrier;
a message transmission unit configured to generate a message and to transmit the message to the user equipment, the message indicating activation or deactivation of the at least one secondary serving cell, the at least one secondary serving cell comprising a secondary serving cell for transmitting an SRS from the user equipment to the base station; and
an SRS reception unit to receive an aperiodic SRS (A-SRS) from the user equipment through an activated one from among the at least one secondary serving cell configured in the user equipment if the message indicates the activation, the activated one being an activated secondary serving cell for transmitting the A-SRS from the UE to the base station.

14. The base station of claim 13, wherein the transmission mode determination unit receives at least one of a scheduling request, a buffer state report (BSR), and information on handover from the user equipment, and determines A-SRS transmission based on the at least one of a scheduling request, a BSR, and information on handover.

15. The base station of claim 13, wherein the message comprises a logical channel identification (LCID) and a bit,
wherein the LCID indicates the activation or deactivation of the at least one secondary serving cell configured in the user equipment, and the bit indicates activation or deactivation of a relevant secondary serving cell and corresponds to a cell index.

16. The base station of claim 13, wherein the message transmission unit transmits the message to the user equipment through a primary serving cell (PCell).

17. A user equipment to transmit a sounding reference signal (SRS) in a wireless communication system supporting multiple component carriers, the user equipment comprising:
a secondary serving cell (SCell) configuration unit to receive, from a base station, reconfiguration information about a secondary serving cell (SCell) corresponding to a secondary component carrier and to reconfigure the secondary serving cell;
a message reception unit to receive a message from the base station, the message indicating activation or deactivation of the secondary serving cell; and
an SRS transmission unit configured to activate the secondary serving cell, the activated secondary serving cell comprising a secondary serving cell for transmitting an SRS from the user equipment to the base station, to enable an aperiodic SRS (A-SRS) transmission to the base station through the activated secondary serving cell for transmitting an SRS from the user equipment to the base station if the message indicates the activation, and to transmit an A-SRS from the user equipment to the base station through the activated secondary serving cell for transmitting an SRS from the user equipment to the base station.

18. The user equipment of claim 17, wherein the message comprises a logical channel identification (LCID) and a bit,
wherein the LCID indicates the activation or deactivation of the secondary serving cell configured in the user equipment, and the bit indicates activation or deactivation of a relevant secondary serving cell and corresponds to a cell index.

19. The user equipment of claim 17, wherein the message reception unit receives a radio resource control (RRC) message including either band allocation information and transmission subframe allocation information for the A-SRS transmission or band allocation information and transmission subframe allocation information for a periodic SRS (P-SRS) transmission.

20. The user equipment of claim 17, wherein the message reception unit receives the message through a primary serving cell (PCell).

* * * * *